United States Patent
Inada

(12) 
(10) Patent No.: US 8,724,914 B2
(45) Date of Patent: May 13, 2014

(54) IMAGE FILE GENERATION DEVICE, IMAGE PROCESSING DEVICE, IMAGE FILE GENERATION METHOD, IMAGE PROCESSING METHOD, AND DATA STRUCTURE FOR IMAGE FILES

(75) Inventor: Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 25 days.

(21) Appl. No.: 13/502,409

(22) PCT Filed: Jul. 29, 2010

(86) PCT No.: PCT/JP2010/004809
§ 371 (c)(1),
(2), (4) Date: Jun. 22, 2012

(87) PCT Pub. No.: WO2011/052117
PCT Pub. Date: May 5, 2011

(65) Prior Publication Data
US 2012/0268465 A1 Oct. 25, 2012

(30) Foreign Application Priority Data

Oct. 26, 2009 (JP) ................................. 2009-245797
Oct. 26, 2009 (JP) ................................. 2009-245798

(51) Int. Cl.
*G06K 9/46* (2006.01)
(52) U.S. Cl.
USPC ........... 382/240; 382/232; 382/233; 382/250; 382/173; 382/251

(58) Field of Classification Search
USPC ......... 382/240, 232, 233, 245, 246, 250, 251; 345/589, 428, 660, 619, 136; 341/79
See application file for complete search history.

(56) References Cited

U.S. PATENT DOCUMENTS 5,081,698 A 1/1992 Koon
6,166,748 A 12/2000 Van Hook
(Continued)

FOREIGN PATENT DOCUMENTS

CN 1349351 A 5/2002
CN 101421678 A 4/2009
(Continued)

OTHER PUBLICATIONS

Office Action issued for corresponding Japanese Patent Application No. 2009-245797, dated May 28, 2013.
(Continued)

*Primary Examiner* — Ali Bayat
(74) *Attorney, Agent, or Firm* — Matthew B. Dernier, Esq.; Gibson & Dernier LLP

(57) ABSTRACT

Hierarchical data in which image data that represents an image at different resolutions is arranged according to the resolution comprises three types of data including a header, index blocks, and tile images. The header defines a plurality of areas produced by dividing the pyramidal hierarchical structure in the virtual space in which the hierarchical data is generated. A pointer pointing to one of the index blocks is set in each area. The index blocks are generated for the respective areas in the structure defined by the header. A pointer pointing to one of the tile images is defined for a position in the images in a plurality of layers belonging to each area. The images are image data actually used to render an image.

27 Claims, 17 Drawing Sheets

(56) References Cited

U.S. PATENT DOCUMENTS

| | | | |
|---|---|---|---|
| 6,239,810 | B1 | 5/2001 | Van Hook |
| 6,331,856 | B1 | 12/2001 | Van Hook |
| 6,342,892 | B1 | 1/2002 | Van Hook |
| 6,535,644 | B1 | 3/2003 | Kurapati |
| 6,556,197 | B1 | 4/2003 | Van Hook |
| 6,563,999 | B1 | 5/2003 | Suzuoki |
| 6,593,929 | B2 | 7/2003 | Van Hook |
| 7,310,098 | B2 | 12/2007 | Ohba |
| 8,390,888 | B2 * | 3/2013 | Matsuda ................. 358/1.9 |
| 8,395,616 | B2 | 3/2013 | Schwerdtner |
| 2003/0080963 | A1 | 5/2003 | Van Hook |
| 2003/0131019 | A1* | 7/2003 | Kobayashi et al. ........ 707/104.1 |
| 2004/0066384 | A1 | 4/2004 | Ohba |
| 2004/0156548 | A1* | 8/2004 | Kodama et al. ............... 382/232 |
| 2010/0040297 | A1* | 2/2010 | Ohba et al. .................... 382/232 |
| 2010/0067075 | A1 | 3/2010 | Schwerdtner |

FOREIGN PATENT DOCUMENTS

| | | | |
|---|---|---|---|
| JP | 2289097 | A | 11/1990 |
| JP | 6225153 | A | 8/1994 |
| JP | 7131658 | A | 5/1995 |
| JP | 9325759 | A | 12/1997 |
| JP | 2003504921 | A | 2/2003 |
| JP | 2004348702 | A | 12/2004 |
| WO | 2007118842 | A1 | 10/2007 |

OTHER PUBLICATIONS

Office Action issued for corresponding Japanese Patent Application No. 2009-245798, dated Mar. 12, 2013.

International Search Report for corresponding PCT Application PCT/JP2010/004809, dated Oct. 19, 2010.

International Preliminary Report on Patentability and Written Opinion for corresponding PCT Application PCT/JP2010/004809, dated May 8, 2012.

Martin Kraus, et al., "Adaptive Texture Maps" Visualization and Interactive Systems Group, Universitaet Stuttgart Germany, Graphics Hardware, The Eurographics Association, pp. 1-10, (2002).

Sylvain Lefebvre, et al., "Unified Texture Management for Arbitrary Meshes" INRIA Rhone-Alpes, Théme COG Systémes cognitifs, Projets EVASION, Rapport de recherche n° 5210, pp. 1-21, (May 2004).

Office Action issued for corresponding Chinese Patent Application No. 201080045762.3, dated Mar. 11, 2014.

* cited by examiner

IMAGE FILE GENERATION DEVICE, IMAGE PROCESSING DEVICE, IMAGE FILE GENERATION METHOD, IMAGE PROCESSING METHOD, AND DATA STRUCTURE FOR IMAGE FILES

The present invention relates to an image processing technology for enlarging/reducing an image displayed on a display, or moving the image upward, downward, leftward, or rightward.

BACKGROUND ART

Home entertainment systems are proposed capable of playing back moving images as well as running game programs. In home entertainment systems, a GPU generates three-dimensional images using polygons (see, for example, patent document No. 1).

Regardless of the purpose of image display, improvement in efficiency of displaying images is an important and constant challenge. High-speed rendering of high-definition images requires various efforts. For example, there is proposed a method of storing texture data separately to make the process of mapping efficient (e.g., non-patent document Nos. 1 and 2).

[patent document 1] U.S. Pat. No. 6,563,999
[non-patent document 1] Sylvain Fefebvre, et. al., Unified Texture Management for Arbitrary Meshes, Repport de recherche, N5210, May 2004, Institut National De Recherche En Informatique Et En Automatique
[non-patent document 2] Martin Kraus, et. al., Adaptive Texture Maps, Graphics Hardware (2002), pp 1-10, The Eurographics Association For responsive display of high-definition images, reduction in data size and high-speed rendering are important and constant challenges. When a need arises to update a part of an image, complex processes of, for example, totally updating the data structure once built are likely to be required, even if the above-mentioned approach of devising a data structure (e.g., texture mapping) is used.

SUMMARY OF THE INVENTION

The present invention addresses the problem and a purpose thereof is to provide an image processing technology capable of reducing the data size of a large-sized image and, at the same time, generating, displaying, and modifying the image efficiently.

One embodiment of the present invention relates to an image file generation device. The image file generation device comprises: an image hierarchy generation unit configured to generate a plurality of pieces of image data with different resolutions from input image data and to generate hierarchical data formed by hierarchizing the plurality of pieces of data according to resolution; an image division unit configured to partition image data in each layer of the hierarchical data into tile images of a predetermined size; an index creation unit configured to create index data that maps tile locations defined by partitioning an image in each layer of the hierarchical data into tile images to data for the tile images used to render the tile locations; and an image file generation unit configured to generate an image file that includes data for the tile images and the index data, wherein the index block creation unit creates the index data in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

Another embodiment of the present invention relates to an image processing device. The image processing device comprises: a storage device configured to store an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations; an input information acquisition unit configured to acknowledge a user request to change a display area including movement on an image plane and change of resolution; and a tile image identification unit configured to identify data for a tile image necessary to render an area that should be newly displayed in accordance with the request to change a display area, by referring to the index block; a display image processing unit configured to read the data for the identified tile image from the storage device and render the area that should be newly displayed, wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

Another embodiment of the present invention relates to an image processing device. The image processing device comprises: an image file acquisition unit configured to read an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations; an update information acquisition unit configured to acquire information on update to an image displayed by using the image file; a tile image generation unit configured to generate data for a new tile image used to render an area to be updated, based on the update information; an index data update unit configured to update data for a tile image mapped to a tile location defined in the index data as being included in the area to be updated to the data for the new tile image; and an image file generation unit configured to generate an image file that includes data for the tile image generated by the tile image generation unit and the index data updated by the index data update unit, wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

Another embodiment of the present invention relates to an image file generation method. The image file generation method comprises: generating a plurality of pieces of image data with different resolutions from input image data, generating hierarchical data formed by hierarchizing the plurality of pieces of data according to resolution, and storing the data in a memory; reading image data in each layer of the hierarchical data from the memory and partitioning the read data into tile images of a predetermined size; creating index data that maps tile locations defined by partitioning an image in each layer of the hierarchical data into tile images to data for the tile images used to render the tile locations, and storing the index data in the memory; and generating an image file that includes data for the tile images and the index data, and storing the generated file in the memory, wherein the creating of index data creates the index data in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

Another embodiment of the present invention relates to an image processing method. The image processing method comprises: reading, from a memory, an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations; acknowledging a user request to change a display area including movement on an image plane and change of resolution; identifying data for a tile image necessary to render an area that should be newly displayed in accordance with the request to change a display area, by referring to the index block; and reading the data for the identified tile image from the memory, rendering the area that should be newly displayed, and displaying the rendered data on a display device; wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

Another embodiment of the present invention relates to an image processing method. The image processing method comprises; reading, from a memory, an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations; acquiring information on update to an image displayed by using the image file; generating data for a new tile image used to render an area to be updated, based on the update information, and storing the generated data in the memory; updating data for a tile image mapped to a tile location defined in the index data as being included in the area to the data for the new tile image; and generating an image file that includes data for the tile image generated by the tile image generation unit and the index data updated by the index data update unit, and storing the data in the memory, wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

Another embodiment of the present invention relates to a data structure of an image file. The data structure is of an image file read from a storage device to display at least a part of an image on a display. The data structure maps data for tile images produced by partitioning, to a predetermined size, image data that represents a single image at different resolutions, to index data, the index data mapping tile locations produced by partitioning an image in each layer of hierarchical data into tile images to data for the tile images used to render the tile locations, the hierarchical data being formed by hierarchizing said image data according to resolution, and wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

Another embodiment of the present invention relates to an image processing device. The image processing device comprises: an image processing request unit configured to run a program and issue a request for image processing including information required to render an image that should be newly displayed; a hierarchical data storage unit configured to store a hierarchical color buffer and a hierarchical Z buffer that hierarchize a color value pixel plane that stores color information for pixels of an image to be rendered and a Z-value pixel plane that stores information on depth of pixels from a viewpoint, respectively, according a plurality of resolutions of the image to be rendered, an image processing unit configured to acknowledge the request for image processing and perform image processing, so as to update the hierarchical color buffer and the hierarchical Z buffer, wherein the image processing unit comprises: a rendering color buffer and a rendering Z buffer that store data for a layer and an area to be rendered, the data being read from the hierarchical color buffer and the hierarchical Z buffer; a rendering unit configured to identify a layer and an area to be rendered by referring to the request for image processing, load associated data into the rendering color buffer and the rendering Z buffer, and perform computation for image processing and update the data in accordance with the request for image processing; and a hierarchical data update unit configured to scale the data in the rendering color buffer and the rendering Z buffer as rendered, in adaptation for the plurality of resolutions, so as to update data in layers of the hierarchical color buffer and the hierarchical Z buffer.

Another embodiment of the present invention relates to an image processing method. The image processing method comprises: running a program and issuing a request for image processing including information required to render an image that should be newly displayed; storing a hierarchical color buffer and a hierarchical Z buffer that hierarchize a color value pixel plane that stores color information for pixels of an image to be rendered and a Z-value pixel plane that stores information on depth of pixels from a viewpoint, respectively, according a plurality of resolutions of the image to be rendered; and acknowledging the request for image processing and performing image processing, so as to update the hierarchical color buffer and the hierarchical Z buffer, wherein the updating of the hierarchical color buffer and the hierarchical Z buffer comprises: identifying a layer and an area to be rendered by referring to the request for image processing, loading associated data from the hierarchical color buffer and the hierarchical Z buffer, and writing the data in the rendering color buffer and the rendering Z buffer; performing computation for image processing by referring to the request for image processing, so as to update the rendering color buffer and the rendering Z buffer; and scaling the data in the rendering color buffer and the rendering Z buffer as updated, in adaptation for the plurality of resolutions, so as to update data in layers of the hierarchical color buffer and the hierarchical Z buffer.

Optional combinations of the aforementioned constituting elements, and implementations of the invention in the form of methods, apparatuses, systems, computer programs, data structures, and recording mediums may also be practiced as additional modes of the present invention.

The present invention provides an image processing device capable of efficiently building image data to display images at a wide variety of resolutions.

BRIEF DESCRIPTION OF THE DRAWINGS

FIG. 20 illustrates how the header and the index block are changed according to the first embodiment when there were no index blocks to which the layer that should be added belongs to;

DETAILED DESCRIPTION OF THE INVENTION

First Embodiment

Image data subject to processing according to this embodiment has a hierarchical structure comprising images of different resolutions generated by reducing the size of an original image in a plurality of stages. An image in each layer is divided into one or a plurality of tile images. For example, the image with the lowest resolution comprises one tile image. The original image with the highest resolution comprises the largest number of tile images. Images are displayed such that an enlarged view or reduced view is presented efficiently by switching an image currently used for rendering to a tile image of a different layer when the displayed image reaches a predetermined resolution.

Figure 1:
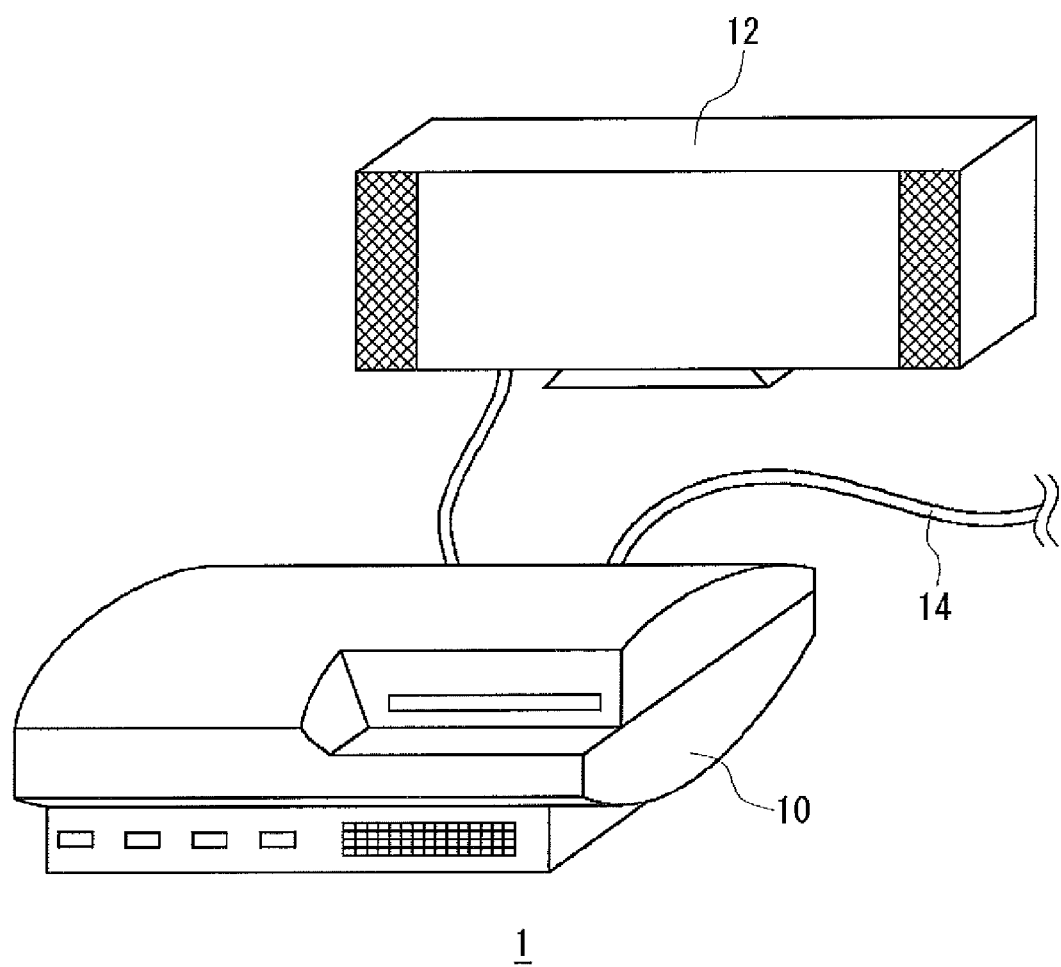
FIG. 1 shows an environment in which an information processing system according to the first embodiment is used.

A description will be given of the basic mode of displaying an image having a hierarchical structure such as that described above. FIG. 1 shows an environment in which an information processing system 1 according to an embodiment of the present invention is used. The information processing system 1 comprises an information processing device 10 configured to run applications including an image processing program and a display device 12 configured to output a result of processing by the information processing device 10. The display device 12 may be a television set provided with a display for outputting an image and a speaker for outputting sound.

The display device 12 may be connected to the information processing device 10 by cable or connected wirelessly using, for example, wireless LAN (Local Area Network). The information processing device 10 in the information processing system 1 may be connected to an external network such as the Internet by a cable 14 and download and acquire content including hierarchized compressed image data. The information processing device 10 may be connected to an external network wirelessly.

The information processing device 10 changes a display area by enlarging/reducing an image displayed on the display of the display device 12 or moving the image upward, downward, leftward, or rightward, in accordance with a user request. When the user manipulates an input device by viewing an image displayed on the display, the input device transmits a request signal to change a display area to the information processing device 10.

Figure 2:
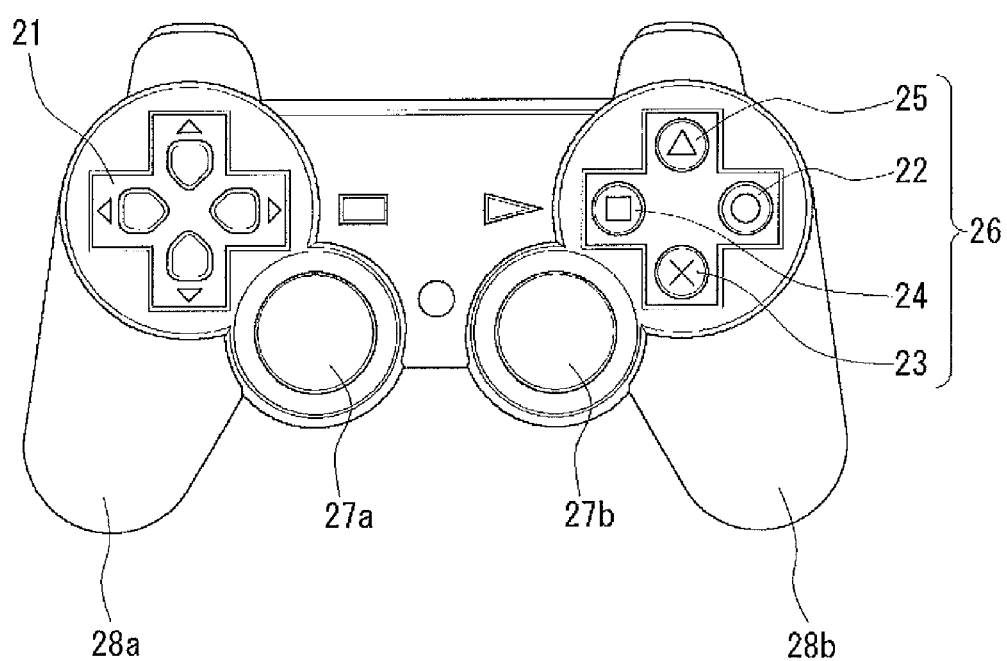
FIG. 2 shows the appearance of the input device that can be used in the image processing system of FIG. 1.

FIG. 2 shows the appearance of the input device 20. The input device 20 is provided with directional keys 21, analog sticks 27a, 27b, and four control buttons 26, which are means for user control. The four buttons 26 comprises a circle button 22, a cross button 23, a square button 24, and a triangle button 25.

The user control means of the input device 20 in the information processing system 1 is assigned the function of entering a request for enlarging/reducing a displayed image, and entering a request for scrolling upward, downward, leftward, or rightward. For example, the function of entering a request for enlarging/reducing a displayed image may be allocated to the right analog stick 27b. The user can enter a request to reduce a displayed image by pulling the analog stick 27b toward the user and can enter a request to enlarge a displayed image by pushing it away from the user. The function of entering a request for moving a display area may be allocated to the directional keys 21. By pressing the directional keys 21, the user can enter a request for movement in the direction in which the directional keys 21 is pressed. The function of entering a request to change an image may be allocated to alternative user control means. For example, the function of entering a request for scrolling may be allocated to the analog stick 27a.

In order to implement the functions described later, the input device 20 is further allocated the function of moving the cursor displayed in an image or selecting a file or a command. The input device 20 may be implemented by an ordinary input device such as a pointing device, a mouse, a keyboard, or a touch panel. Allocation of the aforementioned functions may be determined appropriately depending on the type of the input device 20.

The input device 20 has the function of transferring an input signal requesting change of a display area to the information processing device 10. In the embodiment, the input device 20 is configured to be capable of communicating with the information processing device 10 wirelessly. The input device 20 and the information processing device 10 may establish communication using the Bluetooth (registered trademark) protocol or the IEEE802.11 protocol. The input device 20 may be connected to the information processing device 10 via a cable so as to transfer a signal requesting change of a display area to the information processing device 10 accordingly.

Figure 3:
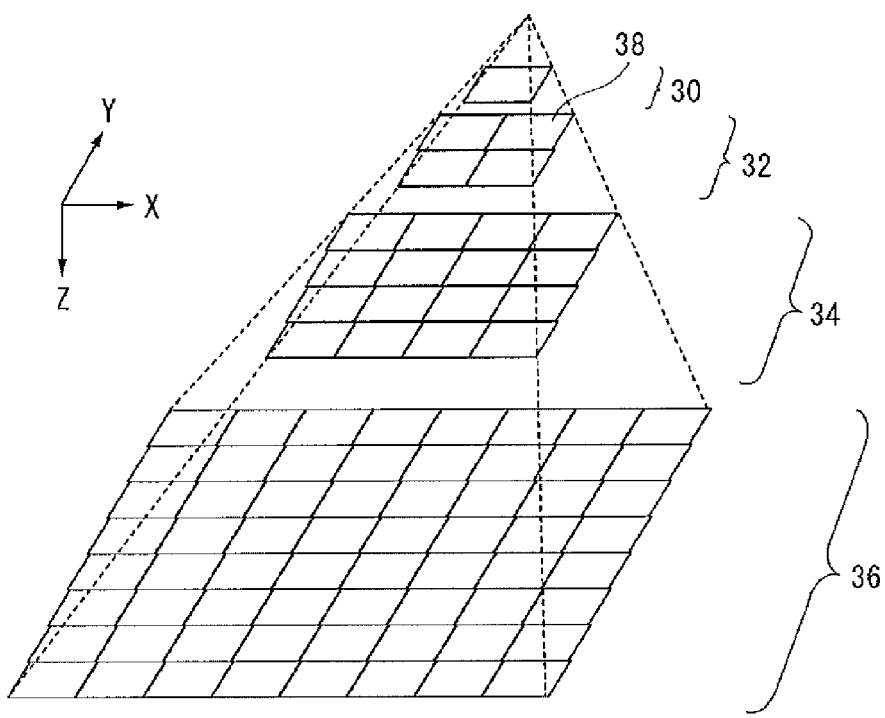
FIG. 3 shows the hierarchical structure of image data used in the first embodiment.

FIG. 3 shows the hierarchical structure of image data used in the embodiment. The image data has a hierarchical structure comprising a 0-th layer 30, a first layer 32, a second layer 34, and a third layer 36 in the direction of depth (Z axis). While the figure only shows four layers, the number of layers is nonrestrictive. Hereinafter, image data having such a hierarchical structure will be referred to as "hierarchical data". It should be noted, however, that the hierarchical data as illustrated in the figure merely represents a conceptual model. In practice, a plurality of data sets are used to represent hierarchical data.

The hierarchical image data shown in FIG. 3 has a quadtree hierarchical structure. Each layer comprises one or more tile images 38. All of the tile images 38 are formed to have the same size having the same number of pixels. For example, an image includes 256 256 pixels. The image data in the respective layers are representations of an image in different resolutions. The original image in the third layer 36 having the highest resolution is reduced in a plurality of stages to generate the image data for the second layer 34, the first layer 32, and the 0-th layer 30. For example, the resolution in the Nth layer (N is an integer equal to or greater than 0) may be ½ the resolution of the (N+1)th layer in both the horizontal (X axis) direction and the vertical (Y axis) direction.

In the information processing device 10, the hierarchical image data is compressed in a predefined compression format and is stored in a storage device and is read from the storage device and decoded before being displayed on the display. The information processing device 10 according to the embodiment is provided with the decoding function compatible with a plurality of compression formats. For example, the device is capable of decoding compressed data in the S3TC format, JPEG format, JPEG2000 format.

As shown in FIG. 3, the hierarchical structure of hierarchical data is configured such that the horizontal direction is defined along the X axis, the vertical direction is defined along the Y axis, and the depth direction is defined along the Z axis, thereby building a virtual three-dimensional space. Upon deriving the amount of change in the displayed image by referring to the signal supplied from the input device 20 and requesting change of a display area, the information processing device 10 uses the amount of change to derive the coordinates at the four corners of a frame (frame coordinates) in the virtual space. Frame coordinates in the virtual space are used to load compressed data into the main memory or generate a displayed image. Instead of the frame coordinates in the virtual space, the information processing device 10 may derive information identifying the layer and the texture coordinates (UV coordinates) in the layer. Hereinafter, the combination of the information identifying the layer and the texture coordinates will also be referred to as frame coordinates.

Figure 4:
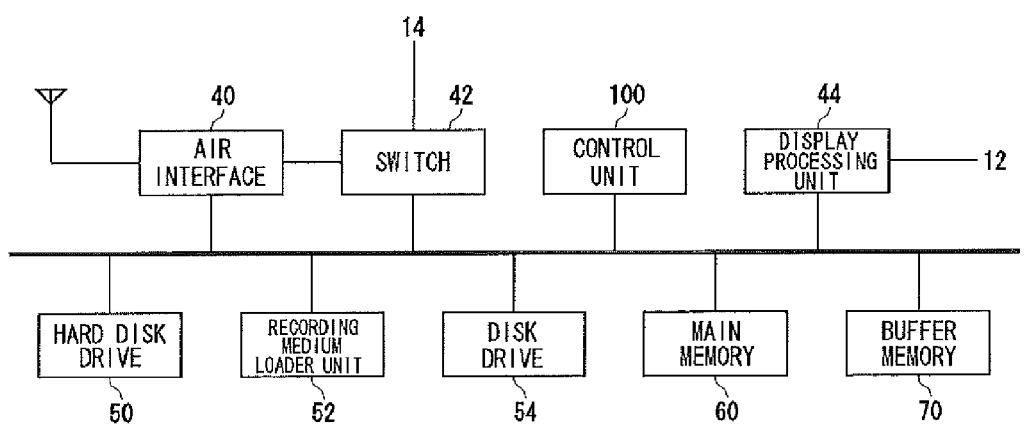
FIG. 4 shows the configuration of the information processing device according to the first embodiment FIG. 5 schematically shows the flow of image data according to the first embodiment.

FIG. 4 shows the configuration of the information processing device 10. The information processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 is connected to an external network via the cable 14 so as to receive data for, for example, content from a server. The switch 42 is connected to the air interface 40. The air interface 40 is connected to the input device 20 using a predefined wireless communication protocol. A signal input by the user via the input device 20 is supplied to the control unit 100 via the air interface 40 and the switch 42.

The hard disk drive 50 functions as a storage device for storing data. The hierarchical image data received via the switch 42 is stored in the hard disk drive 50. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The hierarchical image data may be stored in the recording medium.

The main controller 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The main controller 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70.

The main memory 60 and the buffer memory 70 are storage devices and are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a result of image processing in accordance with user request.

The information processing device 10 according to the embodiment is configured to previously load part of the compressed image data from the hard disk drive 50 into the main memory 60 in order to change a displayed image smoothly as the displayed image is enlarged/reduced or the display area is moved. Further, the device 10 is configured to previously decode part of the compressed image data loaded into the main memory 60 and store the decoded data in the buffer memory 70. This allows instant switching of images used for creation of displayed image when the switching is required later.

Figure 5:
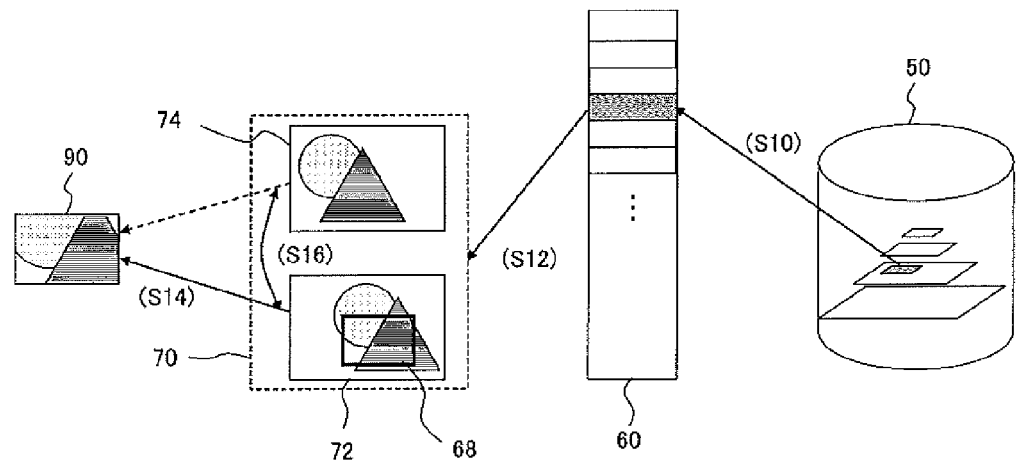

FIG. 5 schematically shows the flow of image data according to the embodiment. Hierarchical data is stored in the hard disk drive 50. A recording medium mounted on the recording medium loader unit 52 or the disk drive 54 may store the data instead of the hard disk 50. Alternatively, the information processing device 10 may download hierarchical data from an image server connected to the information processing device 10 via the network. As described above, the hierarchical data is compressed in a fixed-length format such as S3TC or in a variable-length format such as JPEG.

Of the hierarchical data, part of the image data is loaded into the main memory 60, maintaining a compressed state (S10). An area to be loaded is determined according to a predefined rule. For example, an area close to the currently displayed image in the virtual space, or an area predicted to be frequently requested for display, from a viewpoint of the content of image or the history of browsing by the user, is loaded. The data is loaded not only when a request to change an image is originated but also at predefined time intervals. This prevents heavy traffic for loading processes from occurring in a brief period of time.

Of the compressed image data stored in the main memory 60, data for an image of an area required for display, or data for a tile image of an area predicted to be necessary is decoded and stored in the buffer memory 70 (S12). The buffer memory 70 includes at least two buffer areas 72 and 74. The size of the buffer areas 72 and 74 is configured to be larger than the size of the frame memory 90 so that, when the signal entered via the input device 20 requests a change, in the display area, of a certain degree or less, the image data loaded in the buffer areas 72 and 74 is sufficient to create a displayed image.

One of the buffer areas 72 and 74 is a display buffer used to store an image for creation of displayed image and the other is a decoding buffer used to make available an image predicted to become necessary subsequently. In the example of FIG. 5, the buffer area 72 is a display buffer, the buffer area 74 is a decoding buffer, and a display area 68 is being displayed. The image stored in the decoding buffer in a prefetch process described below may be of the same layer as the image stored in the display buffer or of a different layer with a different scale.

Of the images stored in the buffer area 72, i.e., the display buffer, the image of the display area 68 is rendered in the frame memory 90 (S14). Meanwhile, the image of a new area is decoded as necessary and stored in the buffer area 74. The display buffer and the decoding buffer are switched depending on the timing of completion of storage or the amount of change of the display area 68 (S16). This allows smooth switching between displayed images in the event of the movement of a display area or change in the scale.

Figure 6:
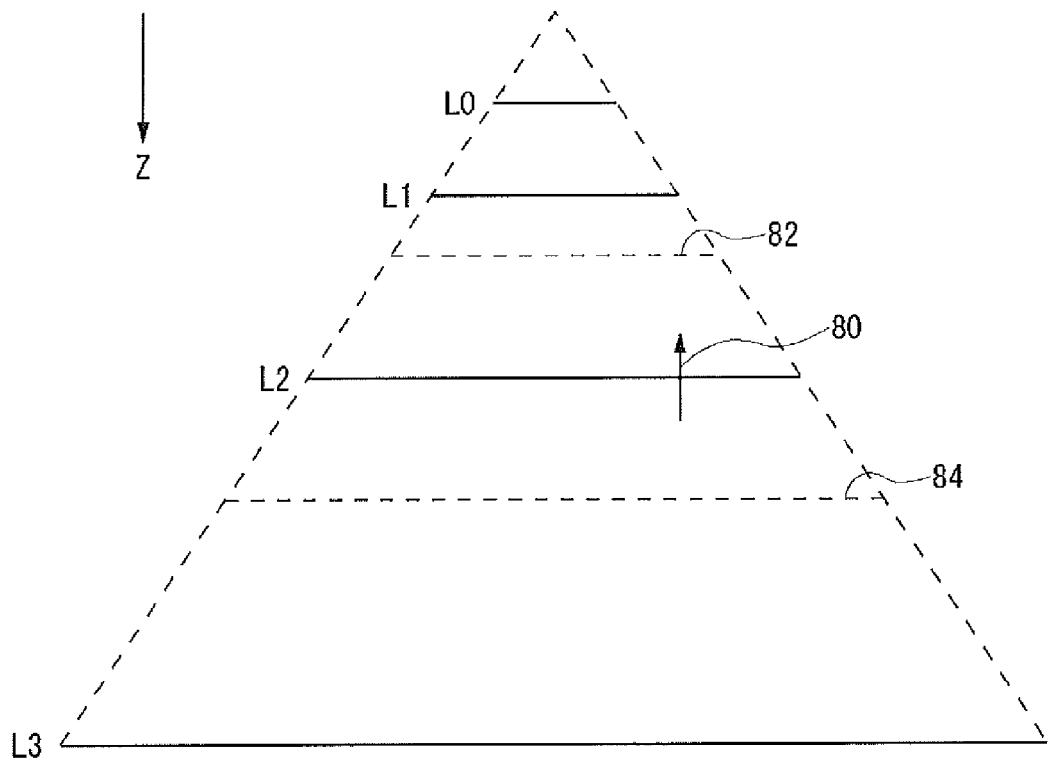
FIG. 6 shows a process of prefetching image data according to the first embodiment.

FIG. 6 shows a prefetch process. FIG. 6 shows the structure of hierarchical data. The layers are represented as L0 (0-th layer), L1 (first layer), L2 (second layer), and L3 (third layer), respectively. In the hierarchical data structure shown in FIG. 6, the position in the depth (Z axis) direction indicates the resolution. The closer to L0, the lower the resolution, and, the closer to L3, the higher the resolution. In terms of the size of the image displayed on the display, the position in the depth direction represents the scale. Assuming that the scale of the displayed image in L3 is 1, the scale in L2 is ¼, the scale in L1 is ¹⁄₁₆, and the scale in L0 is ¹⁄₆₄.

Therefore, if the displayed image changes in the depth direction away from L0 toward L3, the displayed image is enlarged. If the displayed image changes in the direction away from L3 toward L0, the displayed image is reduced. An arrow 80 indicates that a signal requesting a change in the display area input by a user requests reduction in the displayed image and shows that reduction occurs across the scale ¼ (L2). In the information processing device 10, the position of L1, L2, which are made available as tile images 38, in the direction of depth is defined as the boundary of prefetching in the depth direction. When a signal requesting a change in the image indicates crossing the prefetch boundary, the prefetch process is started.

When the scale of the displayed image is close to L2, the displayed image is created by using the tile image in L2 (second layer). More specifically, the L2 tile image is used when the scale of the displayed image is between a switching boundary 82 and a switching boundary 84, the boundary 82 being between the L1 tile image and the L2 tile image, and the boundary 84 being between the L2 tile image and the L3 tile image. Therefore, when reduction of an image is requested as indicated by an arrow 80, the enlarged version of the tile image in L2 is turned into a reduced version and displayed. Meanwhile, the information processing device 10 also identifies the tile image 38 expected to be necessary in the future based on the signal requesting a change in the image and decodes the identified image. In the example of FIG. 6, when the reduction scale requested by the signal requesting a change in the display area exceeds L2, the image processing device 10 prefetches the tile image 38 in L1, which is located in the direction of reduction, from the hard disk drive 50 or the main memory 60, decodes the read image, and writes the decoded image in the buffer memory 70.

Although the above description concerns the prefetch process in the depth direction, prefetching in the upward, downward, leftward, or rightward direction in the identical layer is also processed in a similar manner. More specifically, the prefetch boundary is set in the image data stored in the buffer memory 70 so that, when the display position indicated by the signal requesting a change in the image exceeds the prefetch boundary, the prefetch process is started.

Figure 7:
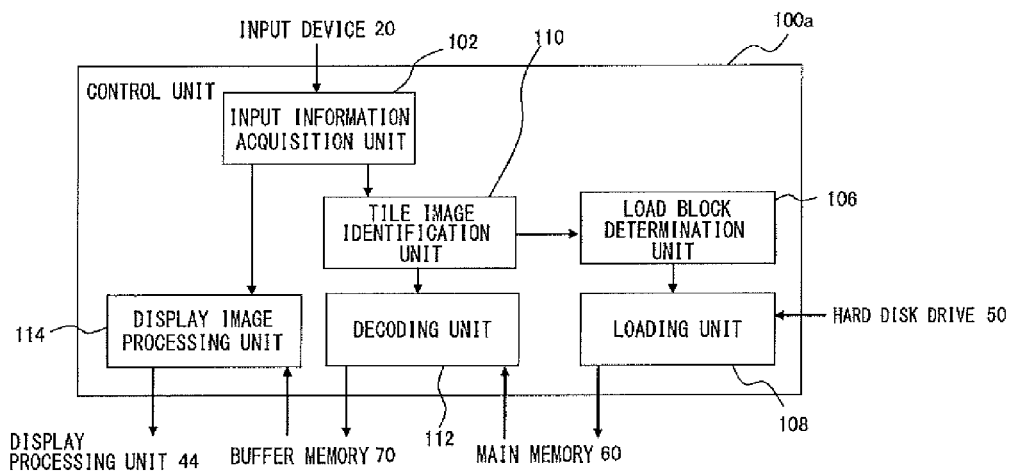
FIG. 7 shows the configuration of a control unit having the function of displaying hierarchical data according to the first embodiment in detail.

FIG. 7 shows the configuration of the control unit 100a having the function of displaying hierarchical data described above according to the embodiment in detail. The control unit 100a comprises an input information acquisition unit 102 for acquiring information entered by the user via the input device 20, a tile image identification unit 110 for identifying a tile including an area that should be newly displayed, a loaded block determination unit 106 for determining an image block that should be newly loaded, and a loading unit 108 for loading a necessary image block from the hard disk drive 50. The control unit 100a further comprises a decoding unit 112 for decoding compressed image data and a displayed image processing unit 114 for rendering a displayed image.

The elements depicted in FIG. 7 as functional blocks for performing various processes are implemented in hardware such as a central processing unit (CPU), memory, or other LSI's, and in software such as a programs etc., loaded into the memory. As describe above, the control unit 100 includes one PPU and a plurality of SPUs. The PPU and the SPUs form the functional blocks alone or in combination. Therefore, it will be obvious to those skilled in the art that the functional blocks may be implemented in a variety of manners by hardware only, software only, or a combination of thereof.

The input information acquisition unit 102 acquires an instruction entered by the user via the input device 20 to start/terminate displaying an image, move the display area, enlarge or reduce the displayed image, etc. The tile image identification unit 110 identifies a tile image including an area that should be displayed, in accordance with the frame coordinates of the current display area and the information on the request to change the display area input by the user. If the tile image is already loaded in the main memory 60, the tile image identification unit 110 supplies the information obtained as a result of the identification to the decoding unit 112. If not, the tile image identification unit 110 supplies the information to the loaded block determination unit 106. In addition to the image necessary to render the current displayed image, the tile image identification unit 110 may identify a tile image predicted to be necessary subsequently.

The loaded block determination unit 106 identifies an image block that should be newly loaded from the hard disk 50 into the main memory 60 by referring to the information from the tile image identification unit 110 and issues a load request to the loading unit 108. While the loading unit 108 is not performing loading process, the loaded block determination unit 106 may issue a load request according to a predetermined timing schedule. For example, the loaded block determination unit 106 may issue a load request at predetermined time intervals or when the user issues a request to change the display area. The loading unit 108 performs an actual loading process in accordance with a request from the loaded block determination unit 106.

The decoding unit 112 reads and decodes the data for the tile image from the main memory 60 by referring to the information on the tile image acquired from the tile image identification unit 110 and stores the decoded data in the decoding buffer or the display buffer. The displayed image processing unit 114 refers to the frame coordinates of the new displayed image, reads the corresponding image data from the display buffer in the buffer memory 70, and renders the data in the frame memory of the display processing unit 44.

Figure 8:
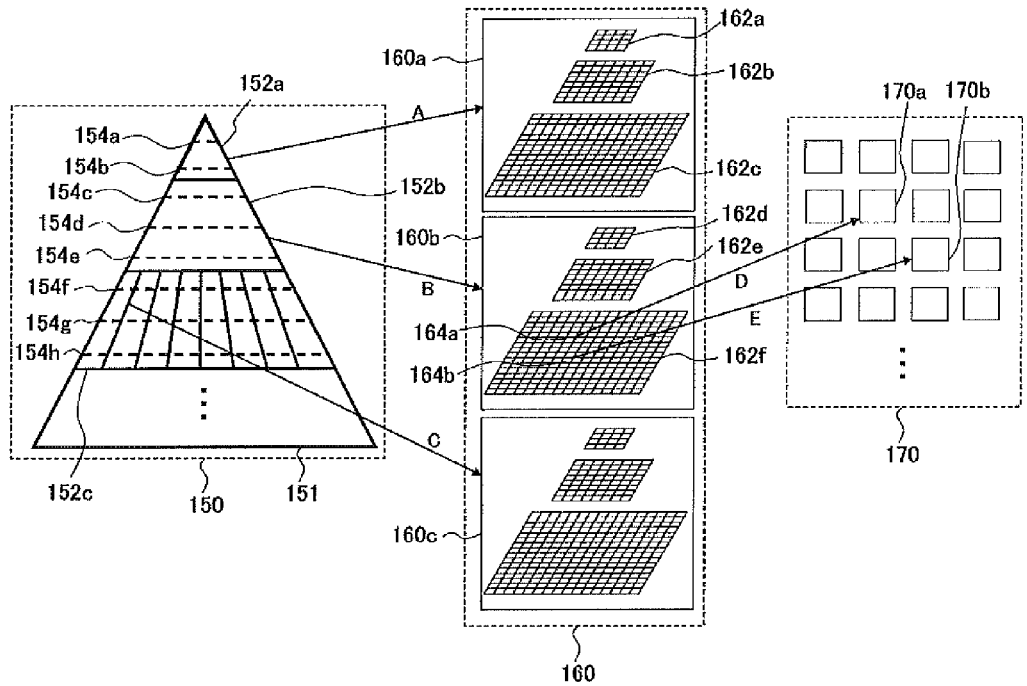
FIG. 8 schematically shows the data structure of hierarchical data used in the first embodiment.

A description will now be given of an embodiment adapted to the technology of displaying image data having the hierarchical structure as described above, and capable of building and outputting image data more efficiently. FIG. 8 schematically shows the data structure of hierarchical data according to the embodiment. The hierarchical data according to this embodiment comprises three types of data including a header 150, index blocks 160, and tile images 170. The header 150 and the index blocks 160 are indices for identifying a tile image subject to processing based on a position in the virtual space formed by the hierarchical data. In this embodiment, the hierarchical structure in the virtual space is divided into areas and is organized area by area by using indices pointing to tile image data so as to enable efficient access to tile images.

The header 150 defines a plurality of areas produced by dividing the pyramidal hierarchical structure in the virtual space as shown in FIG. 3. A pointer pointing to one of the index blocks 160 is set in each area. Referring to the header 150 shown in FIG. 8, a triangle 151 represents the shape of the hierarchical structure as viewed from side. Horizontal broken lines indicate images 154a, 154b, 154c, 154d, 154e, ... in the respective layers. The hierarchical structure is divided into areas as indicated by solid lines to define areas including an area 152a, an area 152b, an area 152c, etc. . . . Basically, the header 150 is configured such that a pointer pointing to one of the index blocks 160 is defined for each area.

FIG. 8 shows that a pointer (arrow A) pointing to an index block 160a is defined for the area 152a, a pointer (arrow B) pointing to an index block 160b is defined for the area 152b, a pointer (arrow C) pointing to an index block 160c is defined for the area 152c. As mentioned later, however, a null pointer not pointing to any specific index block may be defined for some of the areas defined in the header.

The index blocks 160 are generated for the respective areas in the structure defined by the header 150. A pointer pointing to one of the tile images 170 is defined for a position in the images in a plurality of layers belonging to each area. As shown in FIG. 8, an index block corresponding to an area in the header 150 includes data for at least some of the areas in the images in the plurality of layers belonging to the area. In the illustrated example, the index block 160a corresponding to the area 152a contains the entirety of data for the images 154a and 154b in the two layers belonging to the area 152a. The index block 160b corresponding to the area 152b contains the entirety of data for the images 154c, 154d, and 154e in the three layers belonging to the area 152b.

The index block 160c corresponding to the area 152c contains the data for parts of the images 154f, 154g, and 154h in the three layers belonging to the area 152c. Each tile location defined by dividing an image plane in each layer into sizes of a tile image contains a pointer pointing to one of the tile images 170, i.e., actual image data of the tile location. However, a tile location may contain pointers pointing to a plurality of tile images if a tile location is configured to be rendered using a plurality of information items, as will be described later. The three planes shown in each of the index blocks 160a, 160b, and 160c in FIG. 8 correspond to the layers belonging to the corresponding area. Each of the small rectangles in the layer represents a tile location.

FIG. 8 shows that a pointer (arrow D) pointing to a tile image 170a is defined for a tile location 164a in the index block 160b, and a pointer (arrow E) pointing to a tile image 170b is defined for a tile location 164b. A pointer pointing to a specific tile image may not be defined for some of the tile locations defined in the index block, as will be described later. Instead, a null pointer may be defined. The tile images 170 represent compressed data for tile images. By configuring the hierarchical data as described above, the tile image identification unit 110, having learned the frame coordinates in the virtual space of an image frame to be displayed, is capable of identifying a tile image 170 included in the image frame, by proceeding through the header 150 and then the index blocks 160.

FIG. 8 shows that each of the index blocks 160a, 160b, and 160c is shown to contain index data (i.e., pointers pointing to tile images 170) for image areas in three layers respectively comprising 4×4, 8×8, and 16×16 tile locations. By ensuring that the number of tile locations that can be defined by a single index block 160 is consistent, the size of a storage area required to be reserved in the main memory 60 when one of the index blocks 160 is read from the hard disk 50 remains unchanged regardless of which index block is read. Consequently, management of a storage area is facilitated.

Therefore, areas defined in the header 150 are preferably generated such that the index blocks 160 are of the same size.

If the hierarchical data has a quadtree hierarchical structure as shown in FIG. 3 where the 0-th layer contains a single tile image, the images in the three layers belonging to the area 152b of FIG. 8, i.e., the image 154c in the second layer, the image 154d in the third layer, and the image 154e in the fourth layer comprise 4×4, 8×8, and 16×16 tile locations, respectively.

Therefore, by ensuring that a single index block 160 is capable of defining image areas comprising 4×4, 8×8, and 16×16 tile locations as described above, the entire data for the images in the three layers can be accommodated in a single index block 160b without any modification. In other words, pointers pointing to tile images can be defined such that the entirety of the areas of each of the image 154c in the second layer, the image 154d in the third layer, and the image 154e in the fourth layer in the hierarchical data is mapped to the entirety of the areas in each of the 0-th layer 162d, the first layer 162e, and the second layer 162f of the index block 160b, respectively.

Meanwhile, the area 152a in the header 150 includes the images 154a and 154b in the 0-th layer and the first layer, respectively, and the image 154a in the 0-th layer comprises a single tile image and the image 154b in the first layer comprises 2×2 tile images. As such, the number of layers and the number of tile locations are smaller in comparison with the number of areas that can be defined by a single index block 160a. In such a case, the image 154a in the 0-th layer in the hierarchical data is mapped to a part of the 0-th layer 162a in the index block 160a (e.g., the tile location at top left) and a pointer pointing to a tile image is defined accordingly. Similarly, the image 154b in the first layer is mapped to a part of the first layer 162b in the index block 160a (e.g., 2×2 tile images at top left) and pointers pointing to tile images are defined accordingly. Null pointers are defined for the other tile locations in the index block 160a.

The area 152c in the header 150 includes the images 154f, 154g, and 154h in the fifth layer, the sixth layer and the seventh layer, respectively. These images comprise a larger number of tile images than the number of tile locations that can be defined by a single index block 160. Thus, the image plane is divided as shown in FIG. 8 so that some of the areas of each layer are mapped to the 0-th layer, the first layer, and the second layer in the index block 160c, respectively. The image plane is divided to ensure that the images in a plurality of layers belonging to each index block are representations of the same image area at different resolutions.

The division of the hierarchical structure shown in FIG. 8 is for illustrative purpose only. The division may be determined as appropriate depending on the original hierarchical data structure or a desirable data size of an index block. The mode of division of hierarchical data may be changed as the original image is updated.

Figure 9:
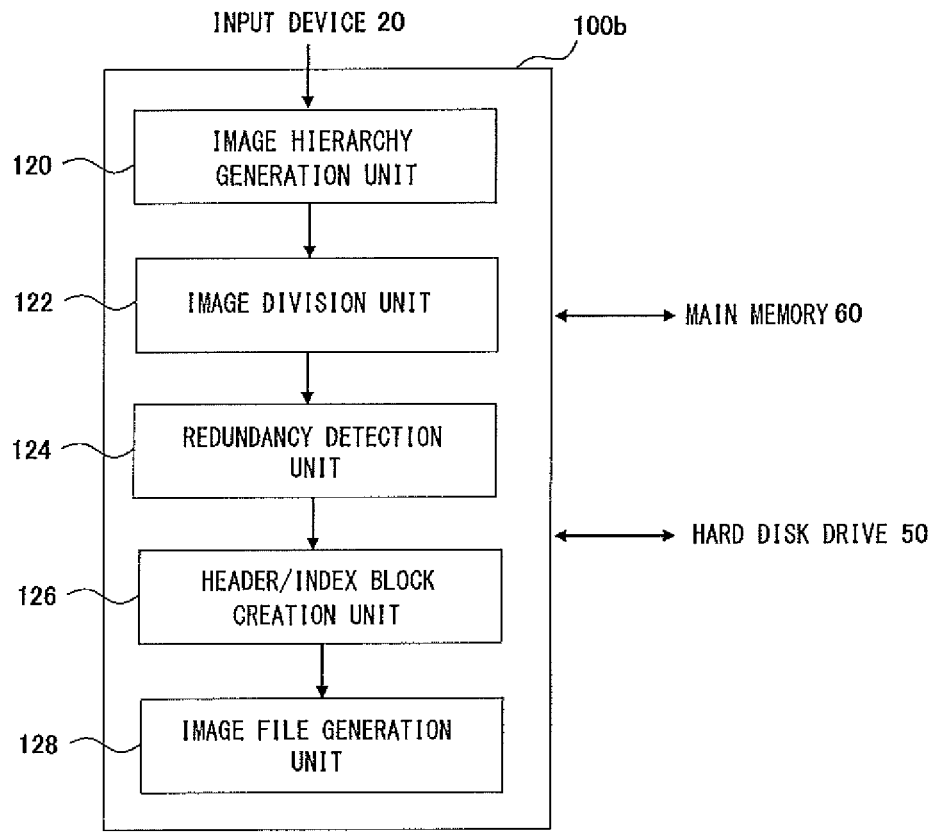
FIG. 9 shows the configuration of a control unit having the function of generating an image file for display according to the first embodiment.

A description will now be given of an embodiment for generating an image file including hierarchical data having the data structure described above. This embodiment can also be implemented by a device configuration similar to that of the information processing system shown in FIG. 1 and the information processing device 10 shown in FIG. 4. FIG. 9 shows the configuration of a control unit 100b having the function of generating an image file for display according to this embodiment. The control unit 100b may be provided with the function for image display like the control unit 100a shown in FIG. 7, but the function is not illustrated in FIG. 9. The image processing device 10 provided with the control unit 100b having only the function shown in FIG. 9 may be provided apart from the information processing device exhibiting the display function.

The control unit 100b includes an image hierarchy generation unit 120 configured to read image data stored in the hard disk drive 50 and hierarchize the data, an image division unit 122 configured to divide the image in each layer into tile images, a redundancy detection unit 124 configured to analyze the image in each layer and detect redundancy, a header/index block generation unit 126 configured to generate data for a header and an index block in consideration of redundancy, and an image file generation unit 128 configured to generate an image file that should be ultimately output and that includes a tile image, a header, and an index block.

The image hierarchy generation unit 120 reads from the hard disk drive 50 data for an image for which a file should be created. The image data read may be a single item of image data of a certain resolution. The image data subject to processing may be designated by the user via the input device 20 as shown. Alternatively, a request may be acknowledged from another functional block (not shown) that obtained the original image. The image hierarchy generation unit 120 then generates image data of a hierarchical structure including the original image, by reducing the data for the read image in stages defined by respective resolutions to generate data for reduced images.

The image division unit 122 generates data for tile images by dividing an image in each layer into predetermined sizes. The data of tile images is stored in the main memory 60. The position of each tile image in the original image is managed by, for example, assigning identification numbers to tile images.

The redundancy detection unit 124 detects redundancy between images within the same layer or images from different layers, by analyzing the images in the respective layers. For example, redundancy within the same layer may occur when the same tile image data can be used over a plurality of tile locations. Redundancy across different layers may occur when an image produced from enlarging an image in a low-resolution layer does not look so different from an image in a high-resolution layer. Areas with redundancy as described above can be displayed by consistently using data for a given tile image and without maintaining data for individual tile images. This will make it possible to compress image data. A specific method will be described later.

The header/index block generation unit 126 creates data for the header and the index block as described above. In an image where redundancy is not detected, a pointer pointing to one of the index blocks is defined for all areas defined in the header. Further, for all tile locations defined in the index blocks, a pointer pointing to a tile image is defined. In an image area having redundancy, data for a tile image is shared by defining a null pointer in the header or in the index block.

The image file generation unit 128 reads the data for the tile image pointed to by the pointer defined in the index block and generates ultimate image data by concatenating the data sequentially. The image file generation unit 128 forms the ultimate output data by generating an image file including the image data, the header, and the index block. Thus, the size of image data can be efficiently reduced by detecting redundancy between images and using data for a single tile image to render a plurality of areas. The image data according to this embodiment comprises images with different resolutions. Therefore, the data can be compressed at a high rate by using data for a given tile image to represent images from different layers.

Figure 10:
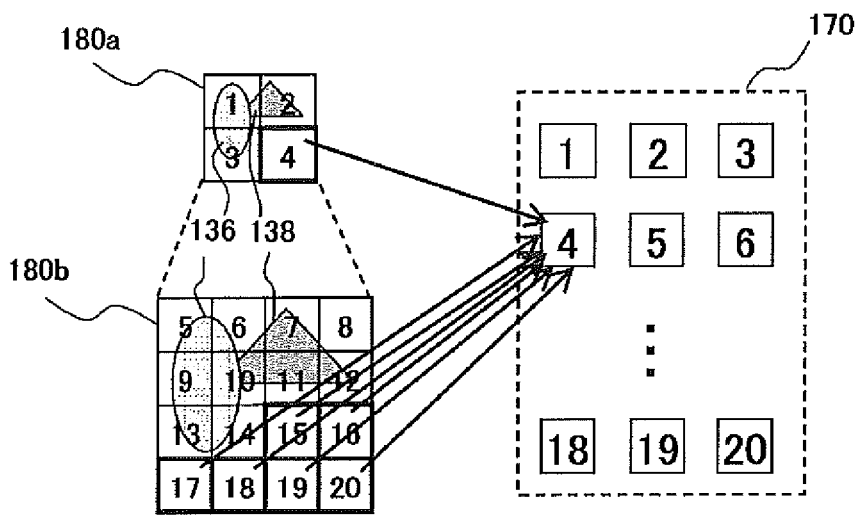
FIG. 10 shows exemplary relationship according to the first embodiment between an original image and tile images in the presence of redundancy in an image.

FIG. 10 shows how an original image and tile images are related in the presence of redundancy. Referring to FIG. 10, an image 180a and an image 180b are images in two layers representing the same area. In other words, the image 180a is obtained by reducing the image 180b. The grids shown in the images 180a and 180b indicate boundaries for dividing the image into tile images. In the figure, identification numbers are assigned to the tile locations in the images 180a and 180b and to the tile images 170 for descriptive purpose.

It will be assumed that an ellipse and a triangle are drawn in the images 180a and 180b and the remaining areas are filled with a single color to represent the background. Data for the tile images 170 extracted from the areas in the images is stored in the main memory 60 independent of the initial arrangement of images. The tile location "4" in the image 180a, which is an area filled with a single color, is mapped to the tile image "4" extracted therefrom. In this case, a pointer pointing to the tile image "4" is defined for the tile location "4" in the index block 160.

Since the image 180b is a version of the image 180a with a higher resolution, the correspondence between tile locations in the two images can be derived easily based on the magnification factor. In the illustrated example, the tile location "4" in the image 180a is mapped to tile locations "15", "16", "19", and "20" in the image 180b. Therefore, if the tile location "4" of the image 180a is filled with a single color, all of the tile locations "15", "16", "19", and "20" in the image 180b are known to be filled with a single color. In other words, only the tile image "4" is required to display these areas.

Similarly, by scanning the image 180a to identify areas that will be filled with a single color when the image 180a is enlarged to the resolution of the image 180b, the lower half of the tile location "3", i.e., the tile locations "17" and "18" in the image 180b, are found to be filled with a single color. Therefore, these areas can also be displayed by using the tile image "4". By sharing a tile image in this way, data for tile images can be compressed. Further, by not providing a specific pointer in an area in a higher-resolution image that can be displayed using a lower-resolution tile image, data for the header or the index blocks can also be compressed.

According to this embodiment, representations of the same image at different resolutions are subject to processing. Therefore, by sequentially repeating the above process of detecting redundancy, beginning with the image with the lowest resolution, areas having redundancy in a large-sized, high-resolution image can be identified with minimum computational load. In the embodiment described above, areas filled with a single color are detected so that data for a tile image is shared by the areas concurrently identified as being filled with a single color. A similar process may also be useful in areas virtually filled with a single color, a random pattern, or a pattern comprising only repetition. Detection of these areas is performed using area-by-area color histogram or frequency analysis, proceeding from a low-resolution image.

Figure 11:
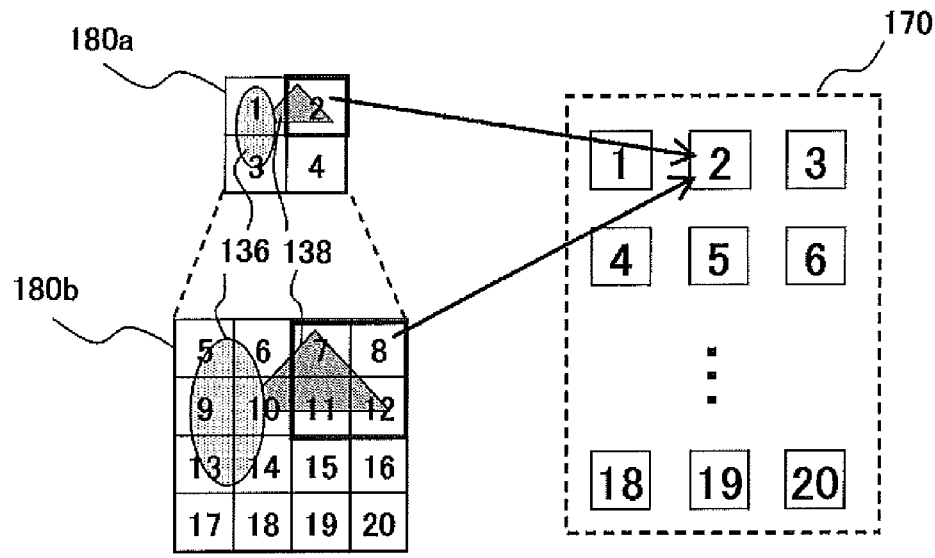
FIG. 11 shows another exemplary relationship according to the first embodiment between an original image and tile images in the presence of redundancy in an image.

FIG. 11 shows how an original image and tile images are related in the presence of redundancy according to another example. The images 180a and 180b are similar to those shown in FIG. 10. Referring to the figure, the tile location "2" in the image 180a is mapped to the tile locations "7", "8", "11", and "12" in the image 180b. Since the image 180b is of a higher resolution than the image 180a, the four tile images extracted from these areas generally include more information than a simple enlarged version of the tile image "2" extracted from the area "2".

However, there may be cases that the images from the areas "7", "8", "11", and "12" in the image 180b look no different from an enlarged version of the tile image "2" such as when the original image is a photo and the four areas are out of focus. In such a case, as in the case of areas filled with a single color described above, an enlarged version of the tile image "2" may be used for display of the areas "7", "8", "11", and "12" instead of the tile images extracted from these areas such that the resultant image looks no different from the original image. Redundancy such as this is identified when the difference between an enlarged version of a lower-resolution image and a higher-resolution image is equal to or below a threshold value, or when frequency analysis of a high-resolution image reveals only a frequency band as low as or lower than a threshold value.

Figure 12:
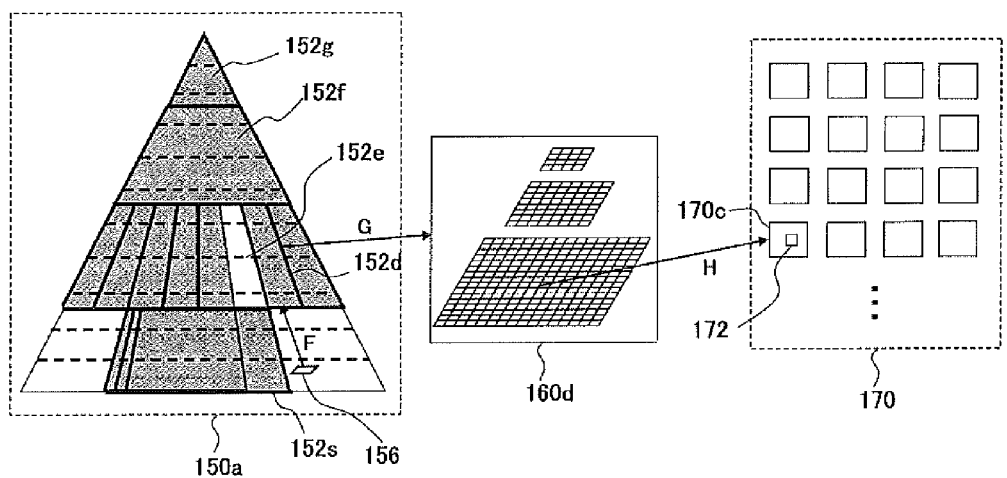
FIG. 12 shows a method for defining in the header how a tile image is shared in the presence of redundancy according to the first embodiment.

FIG. 12 shows a method for defining in the header how a tile image is shared in the presence of redundancy. Of the areas in the hierarchical structure defined in the header 150a, pointers pointing to specific index blocks are not defined for those areas that can be displayed using an image in a layer included in another area. Instead, null pointers are defined for those areas. In the example of FIG. 12, the header 150a is constructed such that pointers pointing to specific index blocks, i.e., valid pointers, are defined for the shaded areas, and null pointers are defined for the blank areas.

It will be assumed that an image area 156 in the hierarchical data having the header 150a is displayed. The figure shows that a null pointer is defined for the area that includes the image area 156. In this case, the virtual space of the hierarchical data is searched in the direction in which the image is reduced so as to identify an area which includes a reduced version of the image area 156 and for which a valid pointer is defined (arrow F). Since a valid pointer is defined in an area 152d as shown in the figure, data for the index block 160d designated by the pointer is acquired (arrow G).

The tile location in the second layer, the layer with the highest resolution among the layers for which the index block 160d contains data, that includes the image area 156 is identified. The pointer mapped to the identified tile location is then acquired. The location of the image area 156 in the image plane of the second layer of the area 152d can be easily computed by referring to the scale of the layers in the hierarchical data. The above-mentioned identification of the tile location is done based on such computation.

Data for a tile image 170c designated by the acquired pointer is acquired (arrow H). The displayed image of the image area 156 is generated using the acquired data. Assuming that the image area 156 has the size of a tile image, a partial area 172 of the tile image 170c, a reduced image, is enlarged as shown to render the image area 156. As described above, the location of the area 172 corresponding to the image area 156 can be easily computed by referring to the scale of the area 172 relative to the image area 156.

By allowing the header 150a to define a null pointer, it is not necessary to provide index blocks for all of the areas defined by the header 150a. As a result, efficiency of data conversion is improved. An area where a null pointer is defined need not be toward the higher resolution. As shown in FIG. 12, a null pointer may be defined for an area 152e, which is sandwiched between a low-resolution area and a high-resolution area to produce an area devoid of a valid pointer. In this case, an image in a layer belonging to the area 152f toward the lower resolution is enlarged to display an image included in the area 152e. When the resolution of the displayed image is increased to enter the area 152s, the index block designated by the pointer defined for the area is referred to so as to acquire a tile image.

This allows an image different from the image hitherto displayed to be displayed once the resolution of a displayed image exceeds a certain level. A decorative touch may be added to the display by, for example, allowing a kana reading of a Chinese character on newspaper to appear or allowing an object to appear in the background of a photo, as the resolution is increased. Basically, a null pointer can be defined in the header for an arbitrary area except that it is ensured that a valid pointer is defined for an area 152g at the top of the hierarchical structure, i.e., the area that includes the image with the lowest resolution. This ensures that the search through the hierarchical structure at least arrives at the area 152g and a displayed image can be generated accordingly, no matter where in the other areas null pointers are defined.

Figure 13:
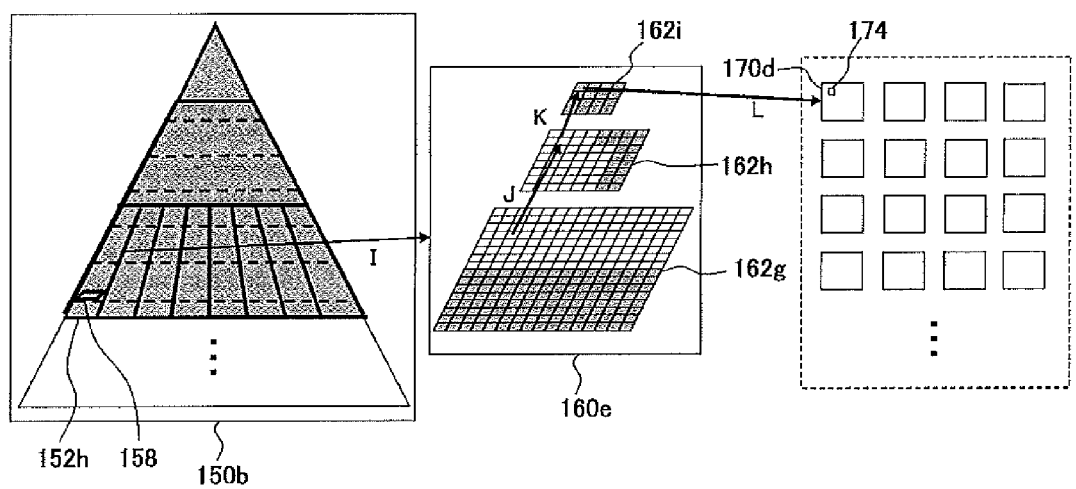
FIG. 13 shows a method for defining in the index block how tile images are shared in the presence of redundancy according to the first embodiment.

FIG. 13 shows a method for defining in the index block how tile images are shared in the presence of redundancy. Of the image areas belonging to the index block 160e, pointers pointing to specific tile images are not defined for those areas that can be displayed using an image in another layer included in the index block 160e. Instead, null pointers are defined for those areas. In FIG. 13, pointers pointing to specific tile images, i.e., valid pointers, are defined for the shaded tile locations in the index block 160e, and null pointers are defined for the blank areas.

To display an image area 158 in the figure, an area 152h defined in the header 150b and including the image area 158 is identified first. The index block 160e designated by the pointer defined for the area 152h is then acquired (arrow I). If, of the areas for which the index block 160e holds data, a null pointer is defined for an area found in an image in the second layer 162g and corresponding to the image area 158, the layers belonging to the same index block 160e are searched in the direction in which the image is reduced so as to identify a layer for which a valid pointer is defined for a reduced version of the image area 158.

In the illustrated example, the search first arrives at an image in the first layer 162h (arrow J). However, a null pointer is also defined for the area corresponding to the image area 158. Therefore, the search is continued to reach the images in the 0-th layer 162i with the lowest resolution (arrow K). In the images in the 0-th layer 162i, a valid pointer is defined in the area corresponding to the image area 158. Therefore, data for a tile image 170d designated by the pointer is acquired (arrow L). The displayed image of the image area 158 can be generated using the acquired data. Assuming that the image area 158 has the size of a tile image, a partial area 174 of the tile image 170d, a reduced image, is enlarged as shown to render the image area 158. Similarly as above, the location of the area 174 corresponding to the image area 158 can be easily computed by referring to the scale of the area 174 relative to the image area 158.

By allowing the index block 160e to define a null pointer, it is not necessary to define pointers pointing to tile images for all of the tile locations defined by the index block 160e. Consequently, data for tile images can be compressed and the volume of data for the index block can also be reduced. The relation between images within a given index block remains unchanged in terms how images are produced from one another by enlargement or reduction, even when a tile image is updated. Therefore, it is not necessary to update the pointers pointing to all tile images so that the steps required for updating are minimized.

As in the header, valid pointers are defined for all tile locations in the images in the 0-th layer 162i, the layer with the lowest resolution in the index block. This ensures that, even if a null pointer is defined in another arbitrary area, the search through the layers in the direction of reduction at least arrives at the images in the 0-th layer 162i so that a displayed image is generated accordingly. As an exception, of the areas defined by the header, the area at the top of the hierarchical structure, i.e., the area including the layer with the lowest resolution may inherently contain a relatively smaller number of tile images, as described above. In this case, all layers in the corresponding index block may include areas for which a null pointer is defined.

As set forth above for the header, for a given image area in the index block, a valid pointer may be defined for the high-resolution second layer 162g and the low-resolution 0-th layer 162i, and a null pointer may be defined only for the medium-resolution first layer 162h. To display a bottom left area in the medium-resolution first layer 162h of FIG. 13, an enlarged version of the tile image designated by the pointer defined for the equivalent area in the lower-resolution 0-th layer 162i is used for display. If the resolution of the displayed image is increased until the second layer 162g should be used, the tile image designated by the pointed defined for the equivalent area in the second layer 162g is used to generated a displayed image. As in the case of the header, this could implement a mode of display where a different image is presented for view when a given area is enlarged.

Thus, use of the index block can define the sharing of a tile image in a more detailed fashion (i.e., in units of tile images) than by using the header to define the sharing of an index block. FIGS. 12 and 13 show that a null pointer is defined in the header or the index block. Alternatively, null pointers may be defined in both. In this case, the sharing of an index block and a tile image can be defined in similar steps. In the example described above, a null pointer is defined in the header or the index block to implement an embodiment in which a tile image is shared across different layers. To share a tile image in the same layer, pointers pointing to the same index block may be defined for a plurality of areas, of the areas in the hierarchical structure, that include the same layer. Alternatively, pointers pointing to the same tile image may be defined for a plurality of tile locations in the index block.

Figure 14:
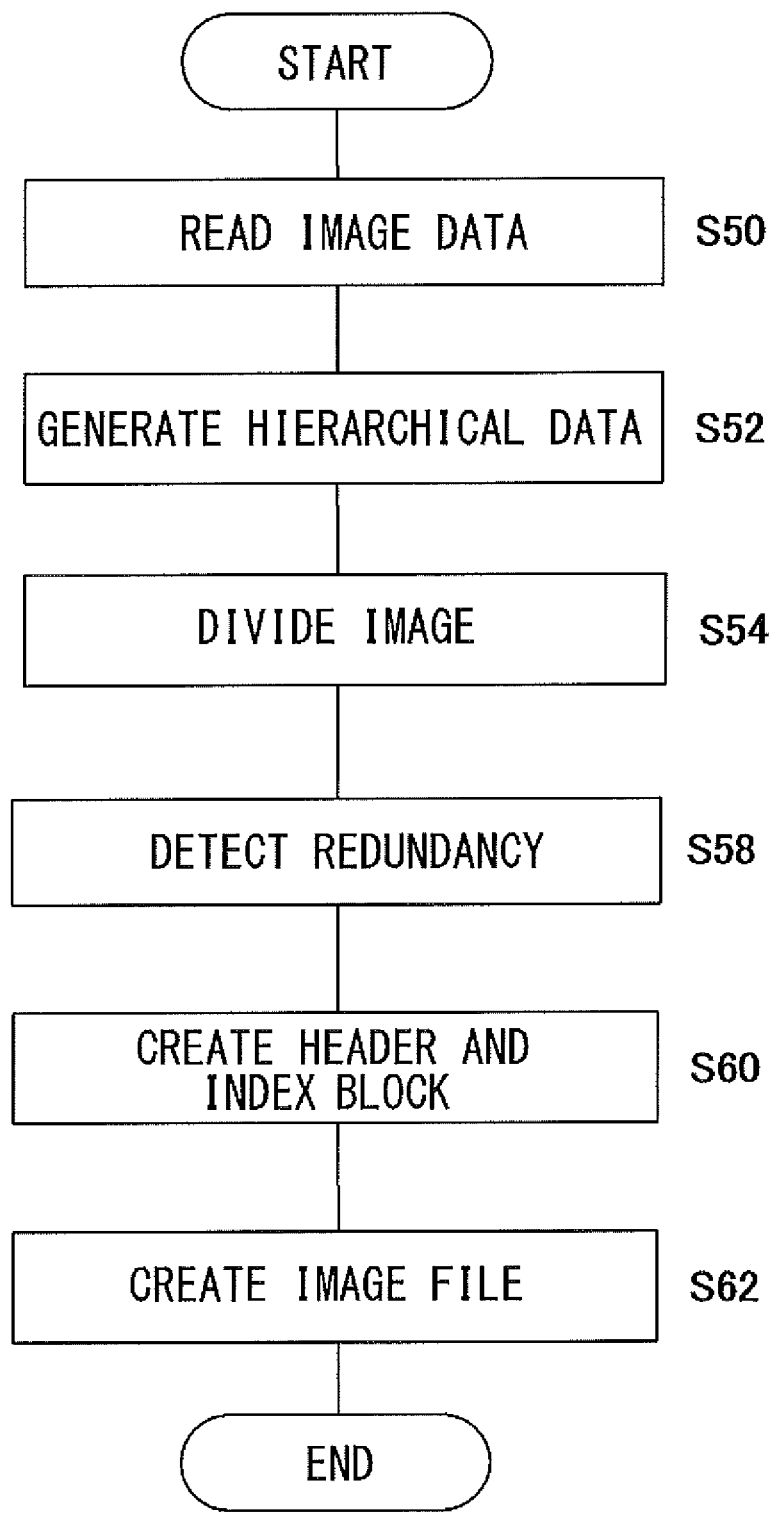
FIG. 14 is a flowchart showing steps whereby the control unit shown in FIG. 9 generates an image file.

A description will now be given of the operation of the control unit 100b having the function of generating an image file. FIG. 14 is a flowchart showing steps whereby the control unit 100b shown in FIG. 9 generates an image file. Initially, when the user or another processing module provides an input to designate image data, the image hierarchy generation unit 120 reads the designated image data from the hard disk drive 50 (S50). The image hierarchy generation unit 120 then generates hierarchical data comprising image data of different resolutions by reducing the read image data as ordinarily done and generating image data having a predetermined resolution (S52). Subsequently, the image division unit 122 divides the image in each layer into tile images and stores the tile images in the main memory 60 (S54). In this process, the position of each tile image in the image and the address indicating the storage area in the main memory 60 are mapped to each other and the mapping is recorded. The recorded mapping is used to generate index blocks.

A file already including tile images may be read in S50. In this case, generation of hierarchical data in S52 and division of the image in S54 can be omitted. By including a value indicating an offset of the address of each tile image from the start address and the position in the image in the file, and by recording, in S54, the start address in the main memory 60 of the file as read in S50, the relationship between the address of each tile image and the position in the image can be acquired.

Subsequently, the redundancy detection unit 124 examines redundancy between images as described above (S58). More specifically, the redundancy detection unit 124 scans the N-th layer images to identify whether there is any area of a size commensurate with the size of a tile image in the N+1-th layer and containing only a single color. The step is repeated toward higher hierarchies. In addition, the redundancy detection unit 124 examines the images to identify an area in the N+1-th layer image containing substantially the same amount of information as the N-th layer image, by examining a differential image produced between an image produced by enlarging the N-th layer image to the size of the N+1-th layer and the N+1-th layer image or by frequency analysis of the N+1-layer image. Any method ordinarily practiced in the field of image processing may be employed for examination.

The header/index block generation unit 126 creates a header and an index block, in consideration of redundancy (S60). More specifically, if the entirety of an area defined in the header can be displayed by enlarging an image belonging to an area of a lower resolution, a null pointer is defined for the higher-resolution area. For the other areas, corresponding index blocks are generated and pointers pointing to the generated index blocks are defined in the header. Of the images in a plurality of layers belonging to each index block, a null pointer is defined for those image areas that can be displayed by enlarging a lower-resolution image. For the other areas, pointers pointing to tile images extracted from the areas are defined.

Subsequently, the image file generation unit 128 creates an image file that should be ultimately output (S62). If the redundancy detection unit 124 does not detect redundancy, the image file generation unit 128 reads all of the data for tile images generated by division in S54 from the main memory 60. The image file generation unit 128 creates an image file that also contains the header and the index block generated in S60. If the redundancy detection unit 124 detects redundancy, the image file generation unit 128 reads only the data for the tile images designated by the pointers defined in the index block generated in S60. The image file generation unit 128 creates an image file that also contains the header and the index block generated in S60.

Figure 15:
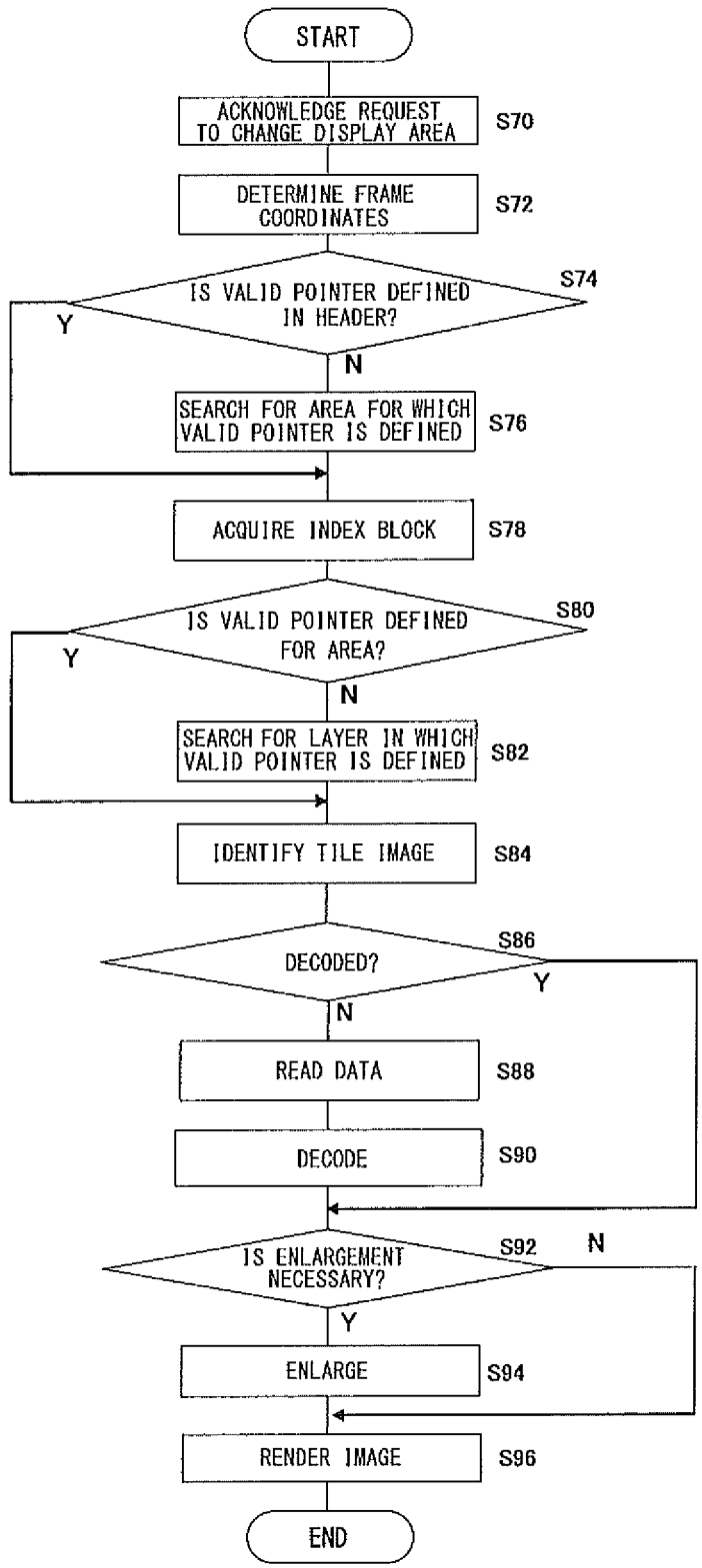
FIG. 15 is a flowchart showing steps whereby the control unit displays an image file according to the first embodiment.

A description will be given of the operation of displaying an image using the image file thus generated. FIG. 15 is a flowchart showing steps for displaying an image, using the image file according to the embodiment. The illustrated steps are implemented by the control unit 100*a* shown in FIG. 7. The flowchart primarily shows a process of reading necessary data from an image file in response to a request to change a display area, and decoding and displaying the image accordingly. The basic flow including loading from a hard disk, prefetching of necessary data, and writing into a buffer memory are similar to the process illustrated in FIG. 5.

Initially, when the user enters a request to change a displayed image via the input device 20 while a part of an image is displayed on the display device 12, the input information acquisition unit 102 acknowledges the request (S70). The tile image identification unit 110 derives the amount of requested change in the displayed image and determines the coordinates of the frame that should be displayed newly (S72). The amount of change in the displayed image represents the amount of movement in the vertical or horizontal direction in the virtual space and the amount of movement in the depth direction. The coordinates of the frame that should be displayed are determined by the frame coordinates of the display area that have been displayed and the amount of change derived.

The tile image identification unit 110 refers to the header and identifies an area to which the frame coordinates belong. The tile image identification unit 110 verifies whether a valid pointer pointing to an index block is defined for the identified area (S74). If a valid pointer is defined (Y in S74), the tile image identification unit 110 acquires the index block designated by the pointer (S78). If a null pointer is defined (N in S74), the tile image identification unit 110 searches the hierarchical structure in the direction in which the image is reduced for an area for which a valid pointer is defined. The tile image identification unit 110 acquires the index block pointed to by the pointer defined for the detected area (S76, S78).

The tile image identification unit 110 searches the index block to determine whether a valid pointer pointing to a tile image is defined for the area corresponding to the frame coordinates (S80). If a valid pointer is defined (Y in S80), the tile image identification unit 110 identifies information uniquely defining the tile image pointed to by the pointer, e.g., the address and the identification number of the tile image (S84). If a null pointer is defined (N in S80), the tile image identification unit 110 searches the hierarchy in the index block in the direction in which the image is reduced. The tile image identification unit 110 searches for a layer in which a valid pointer is defined and identifies a tile image pointed to by the pointer defined for the matching area in the layer thus identified (S82, S84).

If the buffer memory 70 does not store data produced by decoding the tile image (N in S86), the decoding unit 112 reads the data for the tile image from the main memory 60 and decodes the data accordingly (S88, S90).

If an area for which a valid pointer is defined in the header is searched in S76, or if a layer in the index block in which a valid pointer is defined is searched in S82, the tile image as identified should be enlarged and rendered. Therefore, when a tile image is identified through such a step, tile image identification unit 110 provides the decoding unit 112 with information indicating the fact. The decoding unit 112 determines whether it is necessary to enlarge the tile image by referring to the information (S92).

If it is necessary to enlarge the image (Y in S92), the decoding unit 112 enlarges the tile image by referring to the frame coordinates acquired from the tile image identification unit 110 and stores necessary areas in the buffer memory 70 (S94). The above-described process is similarly performed for the tile image already decoded (Y in S86). Irrespective of whether the image is enlarged, the displayed image processing unit 114 renders, in the frame memory, an area in the tile image that should be newly displayed (S96). The rendering process includes a process of enlarging or reducing data stored in the buffer memory 70 depending on the requested resolution.

A description will now be given of the data structure of a pointer in the header and the index block. For example, given that hierarchical data comprising 11 layers is organized into index blocks each comprising three layers respectively comprising 4×4, 8×8, and 16×16 tile locations, as shown in FIG. 8, the total number of areas defined by the header will be 4162. A maximum of 336 tile locations are defined in a single index block. Since a pointer is defined for each of these elements, the data structure should desirably allow efficient search for a pointer. A fixed-length array, an associative array, or a tree structure may be used as the data structure of a pointer.

If the pointer in a header is configured as a fixed-length array, an identification number is assigned to each area. The identification number is used as an index to access the array of fixed-length pointers. In this case, identification of an area immediately results in acquisition of a pointer so that editing or searching can be performed quickly. If an associative array is used, an identification number is assigned to each area. The identification number is used as a key to access the associative array of pointers. In this case, only valid pointers need be stored so that the data size of the head is reduced.

If a tree structure is used, a pointer connecting areas is further defined. Inter-area pointers are searched, starting at the top of the hierarchical structure of images, to identify a desired area. In this case, only those pointers near the top need be updated when a layer is added at the top, as described later. Thus, different data structures of pointers provide different advantages. A proper structure is selected depending on the factor that weighs such as memory cost or processing cost. A method ordinarily used in data search (e.g., B tree structure) may be introduced as appropriate. Pointers in the index block are similarly configured. An appropriate method may be selected in consideration of processing speed, etc.

A pointer pointing to an index block or a pointer pointing to a tile image may include the file name of a file indicating a target index block or tile image, or information on the location of a server connected to the network. This allows data for a single set of layer data to include images from a plurality of files or sites, or allows a single file to be shared by a plurality of sets of layer data.

Figure 16:
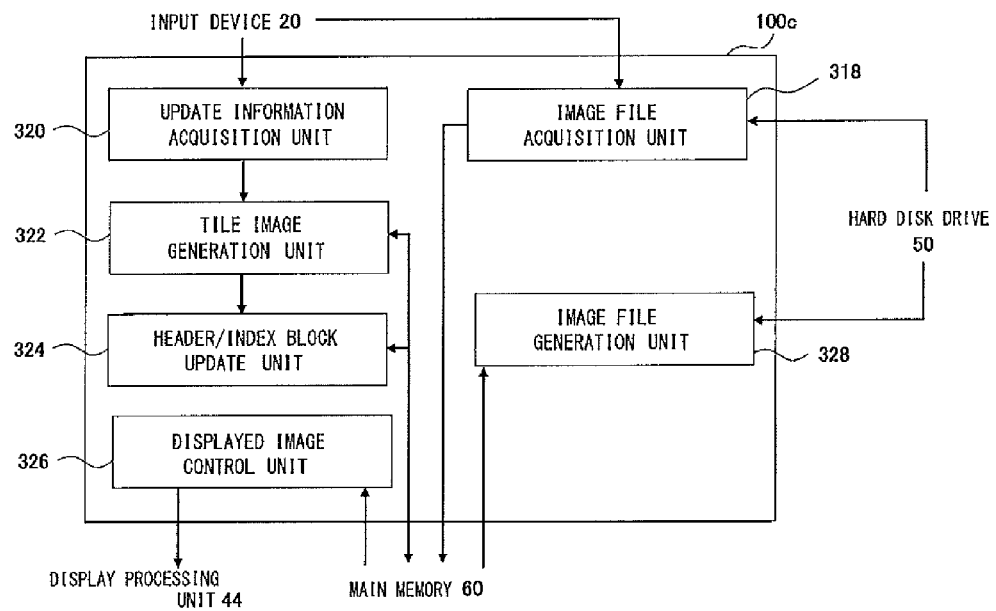
FIG. 16 shows the configuration of a control unit having the function of modifying an image according to the first embodiment.

A description will be given of modification or revision of an image file comprising a header, an index block, and a tile image as described above. This can also be implemented by using the information processing system 1 shown in FIG. 1 and the information processing device 10 shown in FIG. 4 or a similar configuration. FIG. 16 shows the configuration of the control unit 100c having the function of modifying an image according to this embodiment. The control unit 100c may also comprise the function of displaying images like the control unit 100a of FIG. 7, or the function of generating an image file like the control 100b of FIG. 9, but the illustration is omitted in FIG. 16. Alternatively, the information processing device 10 provided with the control unit 100c only having the function shown in FIG. 16 may be provided separately from the image processing device provided with the functions of displaying images and generating an image file.

The control unit 100c comprises: an image file acquisition unit 318 configured to acquire an image file subject to modification: an update information acquisition unit 320 configured to acquire update information comprising an area to be updated by modification and image data for the updated portion: a tile image generation unit 322 configured to generate an updated tile image; a header/index block update unit 324 configured to update a header and an index block; a displayed image control unit 326 configured to display an image being modified; and an image file generation unit 328 configured to generate a modified image file.

The image file acquisition unit 318 acknowledges a user input designating an image subject to modification, reads the relevant image file from the hard disk drive 50, and stores the read file in the main memory 60. The image file includes data for a header, an index block, and a tile image, as described so far. The update information acquisition unit 320 acquires update information that the user enters via the input device 20 while viewing an image subject to modification displayed on the display device 12. As described above, the update information includes the area that should be updated and the post-update image data for that area. A specific example will be given later.

The tile image generation unit 322 identifies a tile image that need be updated when the post-update image is applied to the area that should be updated, and generates a new tile image. If the area that should be updated includes only a part of a given tile image, the original tile image is read from the main memory 60 and a new tile image is generated by overwriting only the area that should be updated. If the entirety of a given tile image is included in the area that should be updated, a new tile image is generated by extracting the post-update image. In this process, new tile images are generated for areas that should be updated, in all layers forming the hierarchical data. Alternatively, only a specified layer may be updated depending on the user request. This will produce a mode of display in which a different image is displayed in a specified range of resolutions.

The tile images thus generated are stored in the main memory 60. In this process, the original image data stored by the image file acquisition unit 318 in the main memory 60 is maintained as it is. The newly generated tile image is stored in another storage area. Subsequently, the header/index block update unit 324 rewrites the pointer defined in the index block stored in the main memory 60 for the area that should be updated so as to point to the newly generated tile image. If an index block corresponding to the area is not found, a new index block is generated, and the null pointer in the header is replaced by a pointer pointing to the generated index block.

The displayed image control unit 326 may comprise functional blocks included in the control unit 100a shown in FIG. 7. Illustration is omitted in FIG. 16. The displayed image control unit 326 displays an image subject to modification through steps similar to those described with reference to FIG. 15. The header and the index block are updated as described above according to user-initiated modification of an image. In association with this, tile images used to render an image are refreshed. This makes it possible for the user to modify or revise an image while viewing the displayed image.

In this embodiment, a newly generated tile image is added in a separate storage area without updating the data for the original tile image. The image is updated by changing the destination of reference by the index block or the header. Compared with the case of searching the original tile images to identify data for a tile image subject to modification and overwriting the data, the above-mentioned method incurs lower processing cost and is capable of displaying the image being modified more responsively. Also, it is easy to return to the original image in the middle of modification.

The image file generation unit 328 overwrites the original tile image data with the newly generated tile image data when, for example, the user completes modification. Alternatively, the newly generated tile image data is stored in a file separate from the original tile image data. The updated index block and the header are added to form an image file.

Figure 17:
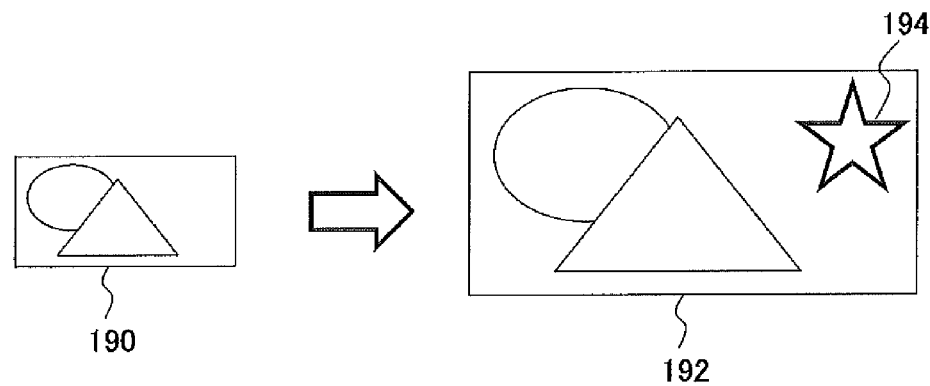
FIG. 17 shows an explanatory example of modifying an image according to the first embodiment.
Figure 18:
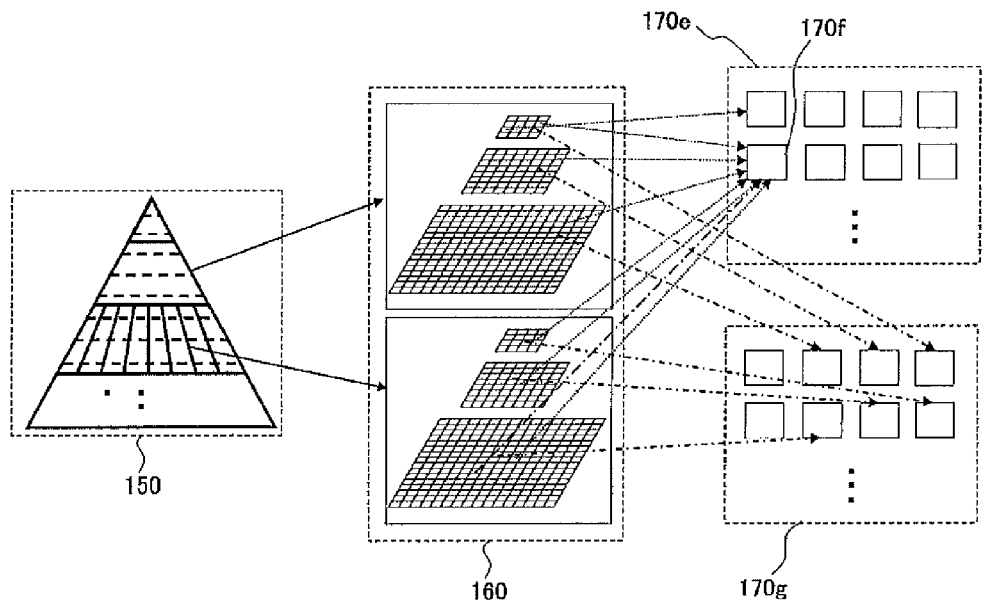
FIG. 18 schematically shows how pointers in the index block are changed in the modification as shown in FIG. 17.

A description will now be given of a specific example of processing data when an image is modified or revised according to the scheme described above. FIG. 17 shows an explanatory example of modifying an image. Referring to the figure, an ellipse and a triangle are drawn in an image 190 before the modification. It will be assumed that the image is modified as indicated by a modified image 192 such that a figure of a star 194 is added at top right of the image. FIG. 18 schematically shows how pointers in the index block are changed in this modification. Referring to the figure, pointers are denoted by arrows. In order to avoid disorganized look of the drawing, only representative arrows are shown.

Before the modification, pointers pointing to respective index blocks 160 or null pointers are defined in the areas defined in the header 150. For each of the tile locations in each of a plurality of layers belonging to the index block 160 designated by the pointer, pointers pointing to respective tile images 170e generated before the modification are defined. If the area at top right of the pre-modification image 190 shown in FIG. 17 comprises a background of a single color, a single tile image can be shared in the area. This is indicated by a large number of broken line arrows pointing to a single tile image 170f in FIG. 18. Naturally, pointers pointing to individual tile images are defined for the other areas.

If a figure of a star 194 is added to the background portion as indicated by the modified image 192 in FIG. 17, new tile images 170g are created for corresponding areas in the respective layers, showing figures of a star at the respective resolutions. The tile images 170g are stored in a storage different from that of the initial tile images 170e. The pointers in the index block 160 for the tile locations included in the area that should be updated are updated to point to respective images in the new tile images 170g. FIG. 18 shows post-update pointers using arrows of chain lines. Following the modification, the area subject to modification is no longer the background so that pointers pointing to respective tile images are defined for the respective tile locations. The areas other than the area subject to modification may remain pointing to the initial tile images 170e.

Figure 19:
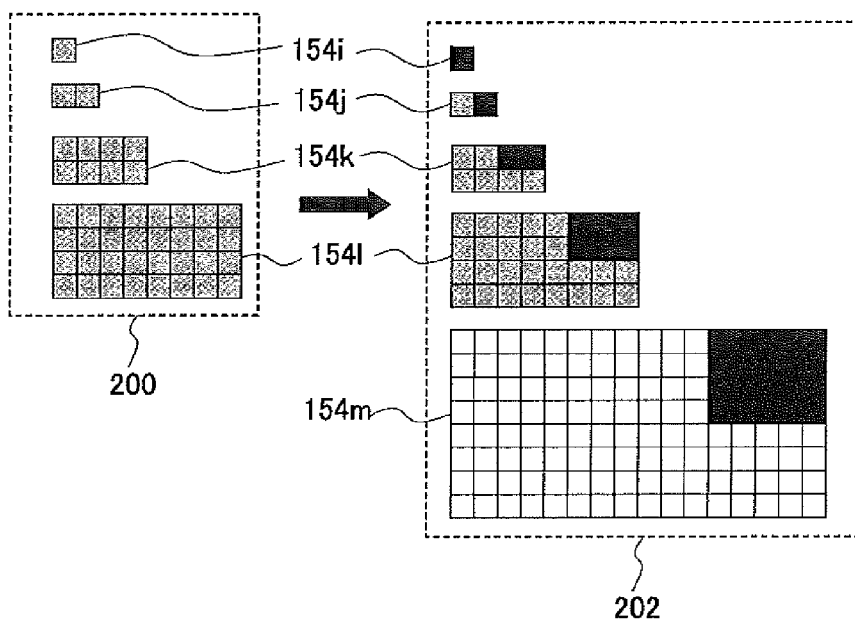
FIG. 19 shows steps of adding a layer of a higher resolution according to the first embodiment.

A description will now be given of steps adding a layer of a higher resolution when an image like the figure of a star 194 of FIG. 17 added by the modification has a higher resolution than the image having the highest resolution in the original hierarchical data. FIG. 19 shows steps of adding a layer of a higher resolution. Referring to the figure, it is assumed that the pre-modification image comprises hierarchical data 200 comprising a 0-th layer 154i, a first layer 154j, a second layer 154k, and a third layer 154l. It is assumed that valid pointers pointing to index blocks are defined for all areas in the header. The areas with valid pointers are indicated by shading in the figure.

If the image is modified by adding a high-resolution image at top right as shown in FIG. 17, tile images for areas subject to updating are newly generated for the respective layers, as described above. In this case, since the added image has a higher resolution than the third layer 154l having the highest resolution in the original hierarchical data, a new layer should be added. In the figure, the added layer is indicated as a fourth layer 154m. Areas for which tile images should be newly generated are indicated in black in the figure.

In this example, modification of the image using a high-resolution image only occurs locally. Therefore, to display areas other than those subject to updating at the resolution of the fourth layer 154m, images in the third layer 154l, which has the highest resolution in the original hierarchical data, are enlarged for use in the display. For this purpose, null pointers are defined for areas in the fourth layer 154m other than the areas subject to updating so as to put tile images in the third layer 154l to use. Areas for which null pointers are defined are indicated by blanks in the figure.

As described above, sharing of a tile image may be defined by using a header or by using an index block. Given that the number of layers organized by a single index block is fixed, an existing index block may have already defined a layer corresponding to the fourth layer 154m that should be added. Because the fourth layer 254m is not found in the original hierarchical data, null pointers are defined for the layer 154m in the index block.

In this case, the null pointers defined in the existing index block for the areas subject to updating in the fourth layer 154m are updated into pointers pointing to the newly generated tile images. The null pointers for the areas other than the areas subject to updating should remain unchanged. Pointers in the index block are updated in the lower-resolution layers as well.

Figure 20:
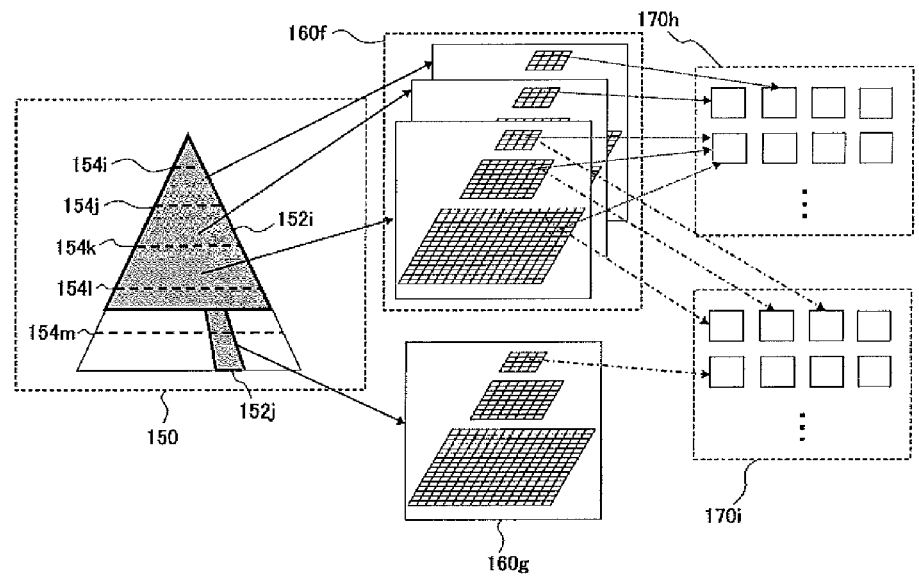

FIG. 20 illustrates how the header and the index block are changed when there were no index blocks to which the layer corresponding to the fourth layer 154m belongs before the addition. An area 152i in the header 150 represents an area defined for the hierarchical data before the modification. The header 150 may define a plurality of areas, of course, but the plurality of areas are denoted by a single area 152i in the illustration. The 0-th layer 154i, the first layer 154j, the second layer 154k, and the third layer 154l existing before the modification belong to the area 152i. Pointers pointing to index blocks 160f are defined for the individual areas. Pointers pointing to existing tile images 170h are defined for the respective tile locations defined in the index blocks 160f (broken line arrows).

To add the fourth layer 154m, a new area including the layer is added in the header 150. As shown in FIG. 20, a valid pointer is defined only for an area 152j including the area subject to updating, and null pointers are set for the other areas. Further, a new index block 160g is generated, and a pointer pointing to the index block 160g is defined for the area 152j. If the fourth layer 154m is the only layer that is added, pointers pointing to tile images need be defined only for one of the three layers belonging to the newly generated index block 160g that has the lowest resolution. Null pointers are defined for all areas in the remaining layers.

Pointers pointing to respective newly generated tile images 170i are defined for tile locations in the newly generated index block 160g that are included in the area subject to updating (chain line arrow). The existing index block 160f is similarly updated such that pointers defined for tile locations included in the area subject to updating point to respective newly generated tile images 170i. When an image file is ultimately generated, the newly generated index block 160g may be appended at the end of the original image file or provided in a separate file. This allows pre-update and post-update images to be displayed.

Figure 21:
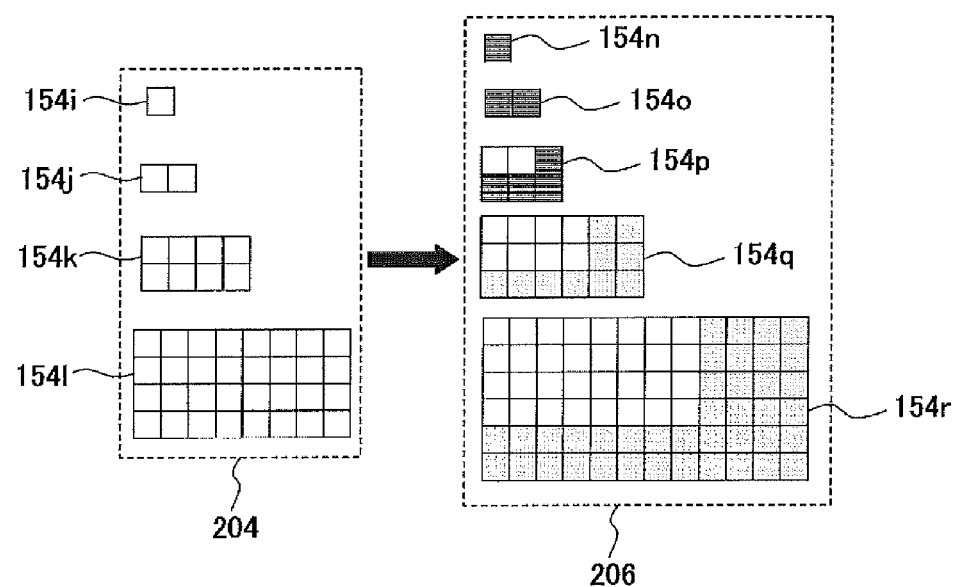
FIG. 21 shows steps of adding a new area to an existing image according to the first embodiment.

A description will now be given of steps of increasing the size of an image by adding a new area such as a background or a rendered area to an existing image. FIG. 21 shows steps of adding a new area to an existing image. Referring to the figure, it is assumed that the pre-addition image comprises hierarchical data 204 comprising a 0-th layer 154i, a first layer 154j, a second layer 154k, and a third layer 154l. A valid pointer pointing to an index block is defined in a header for the area to which the layers belong.

To add an area to this image, hierarchical data 206 is generated in which new areas are added to the images of the respective layers at sizes corresponding to the respective resolutions. In the example of FIG. 21, the hierarchical data 206 comprises a 0-th layer 154n, a first layer 154o, a second layer 154p, a third layer 154q, and a fourth layer 154r. The fourth layer 154r and the third layer 154q can be generated by adding tile images for additional areas indicated by shading to the tile images of the original image indicated by blanks. The second layer 154p is produced, depending on the size thereof, by adding tile images indicated by shading where additional areas and original images are coexistent to the areas indicated by blanks where original tile images can be used unmodified. In the first layer 154o and the 0-th layer 154n, original images and additional areas are coexistent in all tile images forming the layers. Therefore, the layers are indicated by shading.

Figure 22:
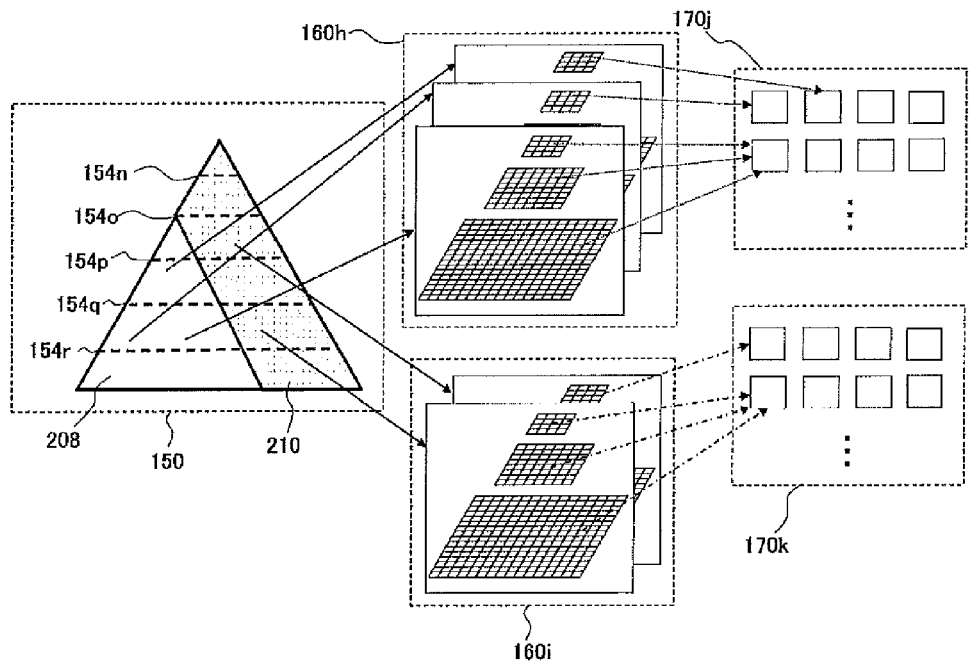
FIG. 22 shows how the header and index blocks are changed when a new area is added according to the first embodiment.

As described above, depending on the layer, original tile images can be used unmodified when new areas are added to the image. The property can be taken advantage of such that existing index blocks are used unmodified, and new index blocks are generated only for areas (e.g., additional areas) for which such blocks are necessary. FIG. 22 shows how the header and index blocks are changed when a new area is added. The blank triangle in the header 150 of the figure indicates an area 208 where original tile images can be used. The shading indicates an area 210 of change added or modified.

The broken lines indicate the 0-th layer 154n, the first layer 154c, the second layer 154p, the third layer 154q, and the fourth layer 154r of FIG. 21. In the respective layers, areas where original tile images can be used, areas that should be added, and areas that should updated by addition are defined, resulting in the structure as shown in FIG. 22. The areas defined by the header are generated from top to bottom of the hierarchical structure. Therefore, as the header 150 is changed as described above, change also occurs in partitions of the areas.

By devising proper partitioning the areas as described later, the areas defined before the change can be reserved for use as much as possible so that the existing index blocks can be used unmodified, even if a change occurs in which the number of layers is increased at the top of the hierarchical data as shown in FIG. 22. Before a new area is added, pointers pointing to index blocks 160h of FIG. 22 are defined for individual areas (not shown) in the area 208. Pointers pointing to the existing tile images 170h are defined for the tile locations defined in the index blocks 160h (broken line arrows).

After the area is added, new index blocks 160i corresponding to the added area are generated. Pointers pointing to the index blocks 160i are defined for individual areas in the new area 210 in the header 150. The header 150 may define a plurality of individual areas (not shown) in the area 210. Pointers (chain line arrows) pointing to the respective new tile images 170k required as a result of adding the area are defined for the respective tile locations in the index blocks 160i thus generated (chain line arrows). The new tile images 170k are tile images of the added area or tile images in which the added area and the original image coexist, which are indicated by the shading in FIG. 21. If the added area represents a background of a single color, a single tile image may be shared.

Given that the partition of areas remains unchanged, the areas initially defined in the header may use the pointers as already defined and, ultimately, the index blocks designated by those pointers. Therefore, there is no need to update pointers defined in the index blocks and pointing to tile images. In the example illustrated above, the added area is located to the right and below the existing image. Whichever direction the image is expanded, change in the header and the index blocks is minimized by dividing the image into areas so that existing index blocks can continue to be used after the expansion.

Figure 23:
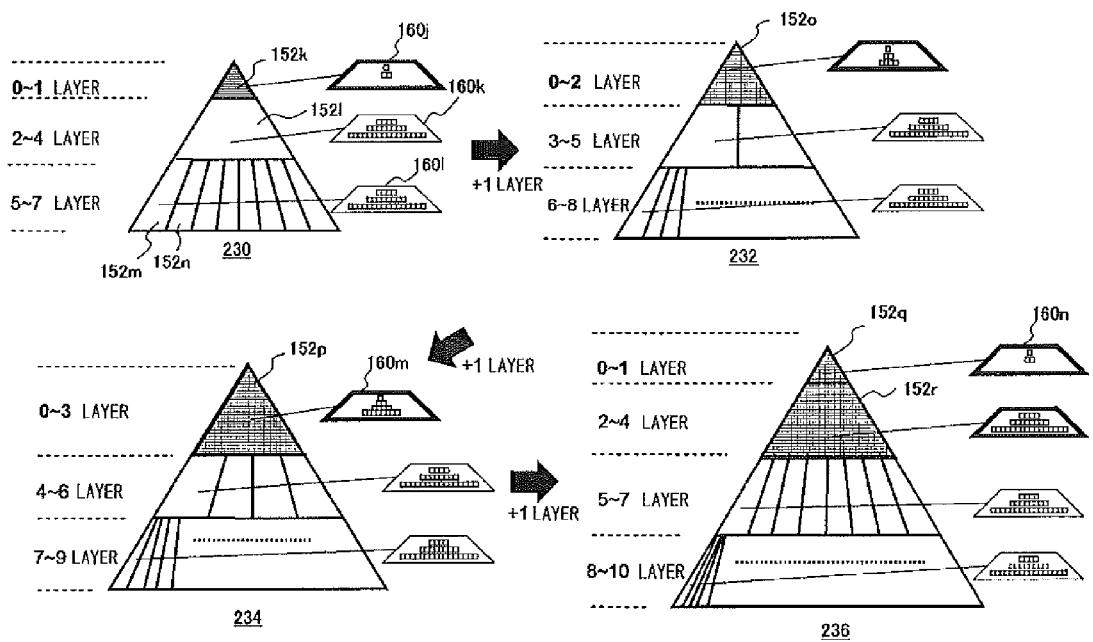
FIG. 23 shows how partition into areas is defined in the header when a layer is added at the top of the hierarchical structure according to the first embodiment.

FIG. 23 shows how partition into areas is defined in the header when a layer is added at the top of the hierarchical structure (e.g., when the image size is increased) as illustrated in FIGS. 21 and 22. The initial hierarchical data 230 is partitioned into areas such that the entirety of the 0-th through first layers is defined as a first area 152k, the entirety of the second through fourth layers is defined as a second area 152l, the areas produced by dividing the fifth through seventh layers according to the location in the image are defined as a third area 152, a fourth area 152n, etc. The structure of the areas is the same as the structure shown in FIG. 8.

As described above, it is ensured that the number of tile images that can be defined in a single index block is uniform irrespective of the index block. Since the first area 152k only comprises the 0-th layer comprising a single tile image and the first layer comprising 2×2 tile images, an index block 160j corresponding to the area 152k only uses the commensurate number of tile locations. Null (invalid) pointers are defined for the other tile locations.

In the index blocks shown in FIG. 23, the number of valid tile locations in the horizontal direction is indicated by rectangles in each layer. Thus, one rectangle and two rectangles are shown in the index block 160j corresponding to the first area 152k. All of 4×4, 8×8, and 16×16 tile locations in index blocks such as 160k, 160l, etc. corresponding to the other areas (e.g., a second area 152l, a third area 152m, etc.) can be made valid. Therefore, 4, 8, and 16 rectangles are shown.

Hierarchical data 232 results from adding one layer at the top of the hierarchical data 230. The layers belonging to the first area before the addition should remain unchanged, and the added layer is additionally included in a first area 152o. The index block 160j corresponding to the initial first area 152k uses only two of the three layers made available as data areas. Therefore, the first area 152o can alone accommodate the addition of the layer by using the layer that used to be invalid. Therefore, the second through fourth layers included in the second area 152l in the original hierarchical data 230 (third through fifth layers after the layer is added) can remain belonging to the same area. However, the images in the respective layers are expanded so that a new area is defined where the image is expanded and an index block is generated accordingly. The same is true of the layer below.

Hierarchical data 234 results from adding one layer at the top of the hierarchical data 232. The layers belonging to the first area before the addition should remain unchanged, and the added layer is additionally included in a first area 152p. This results in four layers included only in the first area 152p. Since the number of tile images made available in a corresponding index block 160m is larger than the number of tile images in the first area 152p, the index block 160m can accommodate information on tile images for the four layers. This means that the layers below can belong to the same areas to which they belong in the initial hierarchical data 230.

Hierarchical data 236 results from adding one layer to the hierarchical data 234. The five layers that result from adding the additional layer to the four layers belonging to the first area 152p in the hierarchical data 234 are partitioned into two areas to produce a first area 152q and a second area 152r. By allowing the first area 152q to include the 0-th through first layers and allowing the second area 152r to include the second through fourth layers, an index block 160n corresponding to the first area 152q only comprises a layer comprising a single tile image and a layer comprising 2×2 tile images, like the index block 160j corresponding to the first area 152k in the initial hierarchical data 230. The second area 152r is similar to the second area 152l of the hierarchical data 230.

The layers below can belong to the same areas to which they belong in the initial hierarchical data 230. By repeating the above-described changes, areas can be defined so as not to affect the other areas as much as possible when a layer is added at the top of the hierarchical data and to consequently use existing index blocks unmodified as much as possible.

When the image is expanded to add areas as shown in FIG. 21 and when the tile images are managed based on the sequence in the raster direction as ordinarily done in image processing, tile images of added areas are inserted between existing tile images, requiring rearranging of tile images and reassignment of identification numbers. The larger the number of tile images, the heavier the load required for processing. According to this embodiment, the image can be expanded to add more areas only by effecting local change in the data, as described above. This results in low processing cost and responsive display of data being updated and responsive generation of an ultimate image file.

Figure 24:
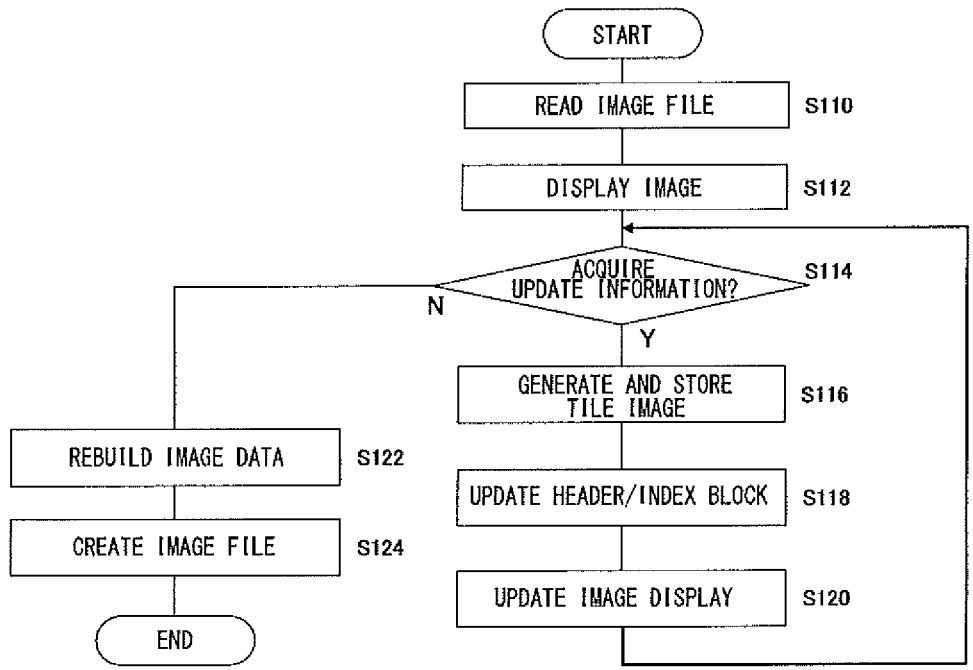
FIG. 24 is a flowchart showing steps performed by the image processing device when the user modifies or revises an image according to the first embodiment.

A description will be given of the operation implemented by the above-described configuration. FIG. 24 is a flowchart showing steps performed by the image processing device when the user modifies or revises an image. Initially, when the user designates an image file subject to modification, the image file acquisition unit 318 reads the relevant image file from the hard disk drive 50 and stores the file in the main memory 60 (S110). This causes the displayed image control unit 326 to display the image defined by the image file on the display device 12 (S112).

When the user enters update information while viewing the image displayed on the display device 12 (Y in S114), the update information acquisition unit 320 acknowledges the information. The tile image generation unit 322 generates a new tile image for the updated portion, and stores the generated tile image in the main memory 60 (S116). The user may enter update information by, for example, dragging an image desired to be pasted which is displayed in the neighborhood of the image displayed on the display device 12 toward a desired area using a pointing device. Alternatively, the user may directly draw a character or a picture in the image using a pointing device or enter a command to add new region.

Subsequently, the header/index block update unit 324 updates the header and the index block as appropriate according to how the image is updated (S118). This causes the displayed image control unit 326 to update the display on the display device 12 by reading the data for the tile image newly referred to and decoding the read data (S120). The steps S114 through S120 are repeated until the modification is completed and update information is no longer available.

When the completion of modification is detected from user input, etc. (N in S114), the image file generation unit 328 rebuilds the image data by incorporating the newly generated tile image stored in the main memory 60 into the image data in the original image file (S122). Alternatively, only the newly generated tile image is stored in a separate file. The image data thus rebuilt is output as an image file along with the header and the index block updated in S118 (S124).

During the process of modification, the header, the index block, and the tile image are stored in a storage area different from that of the existing data. When the user initiates an operation of canceling the immediately preceding updating of an image (Undo), the image can be returned to the initial state easily by restoring the destination of reference of the data. Redo of an operation can also be achieved only by changing the destination of reference.

According to the embodiment described above, the hierarchical data comprises three sets of data including the header, the index block, and the tile image. This allows a tile image to be independent of its position in the image and facilitates management in the event of modification of an image. Further, since a tile image can be shared by a plurality of areas in consideration of redundancy, the data size of tile images can be efficiently reduced.

When a tile image is shared by a plurality of areas, a null pointer is defined in the header or the index block. In the area where the null pointer is defined, the layers are searched toward a lower resolution to identify an area where a valid pointer is defined. This reduces the size of data used for index as compared with the case where pointers pointing to respective tile images are defined in all areas.

Further, the header is used to partition the hierarchical structure into areas. An index block is mapped to each area. In this process, it is ensured that an area includes a plurality of layers. This allows organizing data that is likely to be displayed at a time or subject to modification at a time, as a block. Inefficiency in usage of a storage area or in processing (e.g., loading of unnecessary data into the main memory) can be avoided more easily than otherwise. By ensuring that the fixed number of tile images can be defined in an index block, fragmentation is prevented from occurring when data is cached and management of a storage area is facilitated. Even if the image grows large to a large data size, data that should be displayed or subject to modification can be accessed efficiently by partitioning the hierarchical data into areas.

In the case of hierarchical data comprising 80000 tile images, 200 index blocks are generated if the number of tile locations defined in an index block is 400. Sequential search to identify a given tile image will be required if the hierarchical data merely comprises a list of 80000 tile images. By partitioning the hierarchical data into areas as in this embodiment, search for a single area will be equivalent to search for 400 tile images so that efficient access is possible.

Similarly, the number of index blocks required for images displayed at a time on an ordinary image display device will be 1-2 on the average. It is rare that 4 or more index blocks are necessary. For this reason, partition into areas allows smaller size of index data required at a time and saves the main memory more efficiently than when indices pointing to tile images are maintained without partitioning into areas. As a result, this increases the likelihood that a plurality of sets of hierarchical data can be simultaneously processed without stressing the main memory.

Pointers defined in the header or the index block may define files that stores index blocks or tile images. This allows a single set of hierarchical data to use data read from a plurality of index block files or a plurality of tile image files, enabling more flexible generation or updating of hierarchical data. Different files need not be stored in the same recording medium. Therefore, massive image data exceeding, for example, 4 GB can be generated. This allows non-compressed images, high dynamic range (HDR) images, attribute information, etc. to be processed.

Similarly, a plurality of sets of hierarchical data may share a file of data that is used. For example, the data sizes of individual hierarchical data sets can be reduced by sharing the data of images that can be re-used as a template (e.g., a header or a footer of a magazine) instead of maintaining the data in the individual sets. Not only tile images but also data for index blocks may be shared.

This can be taken advantage of to facilitate upgrading of content that uses hierarchical data. For example, one may distribute a file including data for a header, an index block, and a tile image as content of a regular version. A file containing tile images of higher-resolution layers is provided separately as an add-on. The header and the index block of the regular version are configured to contain pointers pointing to add-on tile images, which will not be displayed unless those tile images are obtained because the pointers remain invalid. When the user upgrades the content, the add-on file is downloaded so that the pointers to the tile images stored in the file are made valid. Accordingly, the add-on images are displayed. This will make upgrading easy without requiring changes in the content file of the regular version. The user may be billed for upgrading.

Second Embodiment

Figure 25:
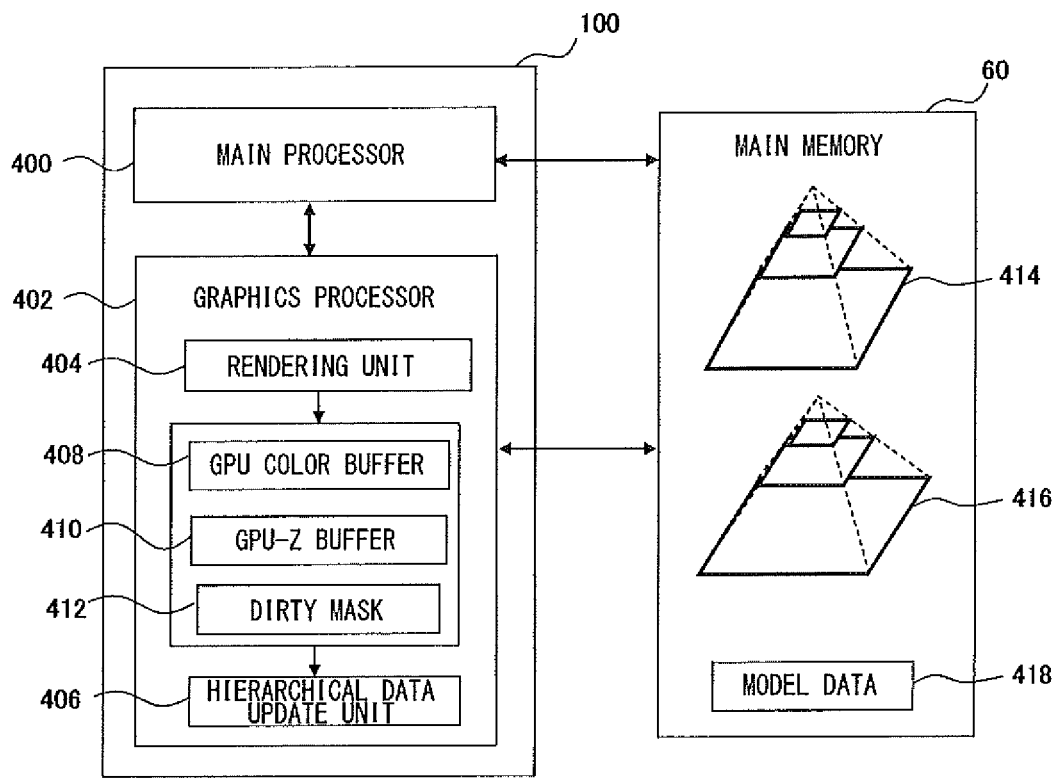
FIG. 25 shows the structure of the control unit and the main memory of the information processing device according to the second embodiment in further detail.

In the first embodiment, an image file is generated and modified primarily by referring to the information entered by the user. In this embodiment, a description will be given of a mode in which a graphics processor renders hierarchical data. By introducing hierarchical data in rendering, only those steps for a required resolution need be performed, as described above in the first embodiment. This allows high-resolution, large-sized images to be processed efficiently. This embodiment can be implemented by the information processing device 10 shown in FIG. 4 of the first embodiment. FIG. 25 shows the structure of the control unit 100 and the main memory 60 of the information processing device 10 according to the embodiment in further detail.

The control unit 100 includes a main processor 400 and a graphics processor 402. The main processor mainly executes an application program run in the information processing device 10 and controls the other functional blocks included in the information processing device 10. The graphics processor 402 performs image processing in accordance with a request for image processing from the main processor 400. Data necessary for image processing is stored in the main memory 60. The graphics processor 402 reads the data to perform image processing accordingly and writes the result in the main memory 60, etc.

The graphics processor 402 uses model data 418 stored in the main memory 60 to render the data in accordance with a request for image processing from the main processor 400. The graphics processor 402 updates a color buffer 414 and a Z buffer 416 stored in the main memory 60. In this embodiment, both the color buffer 414 and the Z buffer 416 are of a hierarchical data structure, as shown in FIG. 25. In other words, the buffers have a structure in which are hierarchized a color value pixel plane that stores color information of the pixels of an image to be rendered, and a Z value pixel plane that stores information on the depth of the pixels from a viewpoint, the planes being hierarchized according to a plurality of resolutions of the image to be rendered. The hierarchical data may comprise a header, index blocks, and tile data, as described in the first embodiment. The tile data represents data for tile locations defined by dividing an image plane in each layer into predetermined sizes.

The graphics processor 402 comprises a rendering unit 404 configured to render in accordance with a request from the main processor 400 and a hierarchical data update unit 406 configured to reflect the result of rendering by the rendering unit 404 in the respective layers in the color buffer 414 and the Z buffer 416. The graphics processor 402 further comprises storage areas temporarily used for rendering, i.e., a GPU color buffer 408, a GPU-Z buffer 410, and a dirty mask 412. The dirty mask 412 has an area of the same size as that of the GPU color buffer 408 and the GPU-Z buffer 410, each pixel storing 1-bit information. When the GPU color buffer 408 and the GPU-Z buffer 410 are updated by rendering, the value of the updated pixel is changed to allow detection of the pixel.

Figure 26:
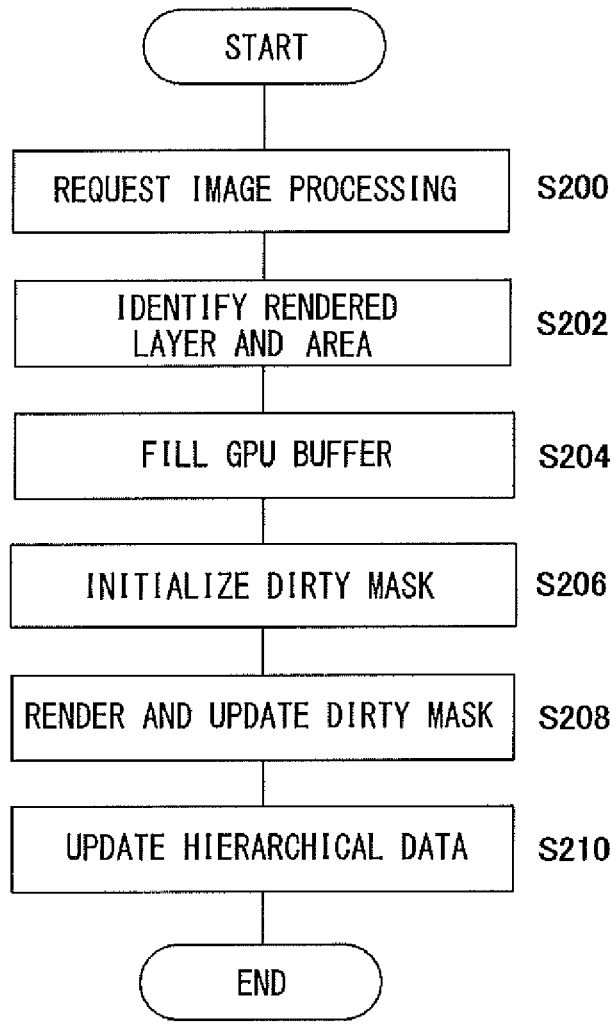
FIG. 26 is a flowchart showing steps of rendering hierarchical data according to the second embodiment.

A description will now be given of the operation performed for rendering by the image processing device having the above-described structure. FIG. 26 is a flowchart showing steps of rendering hierarchical data. Initially, the main processor 400 requests the graphics processor 402 to perform rendering (S200). As described above, data necessary for rendering is stored in the main memory 60. In addition to the model data 418, the main memory 60 also stores the color buffer 414 and the Z buffer 416 having a hierarchical structure as described above.

The rendering unit 404 of the graphics processor 402 identifies a layer and an area in the color buffer 414 and the Z buffer 416 subject to rendering, based on the model data 418, etc. (S202). Subsequently, the rendering unit 404 reads the data for the identified area from the color buffer 414 and the Z buffer 416 and fills the GPU buffer, comprising the GPU color buffer 408 and the GPU-Z buffer 410, with the read data (S204). As in the method of identifying a tile image described in the first embodiment, the header and the index block are searched in the stated order to identify tile data in the layer and the area subject to rendering. Therefore, the data is read in units of tile data.

In this process, the rendering unit 404 initializes the dirty mask 412 (S206). For example, the rendering unit 404 sets the pixel values to "0". The rendering unit 404 follows the generally known method to perform rendering by using the model data 418. The rendering unit 404 updates the GPU color buffer 408 and the GPU-Z buffer 410 as appropriate and updates the pixel values subject to updating in the dirty mask 412 to "1" (S208).

The rendering unit 404 updates the hierarchical data in the color buffer 414 and the Z buffer 416 in the main memory 60, based on the rendering result in the GPU color buffer 408 and the GPU-Z buffer 410 (S210). More specifically, the rendering unit 404 searches the layer and the area in the hierarchical data subject to rendering so as to identify a tile location including pixels subject to updating by referring to the pixel values in the dirty mask 412. The rendering unit 404 updates the data for the tile location based on the rendering result in the GPU color buffer 408 and the GPU-Z buffer 410.

In this process, the rendering unit 404 generates new tile data and updates the pointer defined in the index block to a pointer pointing to the new tile data. If frequent updating is expected, generation of tile data may be omitted and only the pointer may be updated. Tile data may be generated only when the image is finalized. The rendering unit 404 generates new tile data for areas belonging to the layers other the layer subject to rendering and corresponding to the updated area, and updates the pointers defined in the index blocks to pointers pointing to the new tile data. Different layers have different resolutions so that the rendering result is enlarged or reduced to be reflected in the new tile data.

If the tile data for the area subject to rendering is not found in the color buffer 414 and the Z buffer 416 in the first place (e.g., if an image of higher resolution than that existing hierarchical data is rendered), the corresponding area in the layer above is enlarged so as to fill the GPU color buffer 408 and the GPU-Z buffer 410 with the enlarged data. After the rendering, only the updated tile data is reflected in the color buffer 414 and the Z buffer 416 and the pointer in the header or the index block is updated. Subsequently, tile data is generated for the layers other the layer subject to rendering and pointers are updated accordingly, similarly as described above. The process is similar to the process described in the first embodiment with reference to FIG. 19.

If, as a result of enlarging the rendering result in order to reflect the rendering result in the hierarchical data in a layer below the layer subject to rendering in S210, the enlarged rendering result includes any tile location in the layer below, the included tile data is removed and the pointer pointing to the tile data is made invalid. This can reduce the size of tile data. To display the image, the layer in which the pointer is valid is identified by a search so that the image in the layer above is enlarged, as described in the first embodiment.

The color buffer 414 and the Z buffer 416 may store a header and index blocks individually or share a header and index blocks. If the header and the index blocks are shared, a given index block defines a plurality of pointers pointing to a single tile location. In other words, a pointer pointing to the tile data in the color buffer and a pointer pointing to the tile data in the Z buffer are defined. This can compress the data for the header and the index blocks better than by individually storing the header and the index blocks. When an image is finalized after rendering, pointers in the index blocks pointing to the tile data in the Z buffer that is no longer necessary may be deleted. The plurality of pointers defined in an index block for a single tile location may not point to the color buffer or the Z buffer, depending on the image content.

A plurality of color buffers may share a Z buffer. For example, two sets of data may be made available for color buffers and one set of data may be made available for a Z buffer. Rendering may be performed by using a pair comprising one color buffer and the Z buffer and a pair comprising the other color buffer and the Z buffer. In this case, it is more efficient for the buffers to hold the header and the index blocks individually for the purpose of control.

The embodiment described above that renders the color buffer and the Z buffer as hierarchical data can be applied to antialiasing. In other words, hierarchical data comprising a higher-resolution layer and a lower-resolution layer which is to be used for displaying is generated. In ordinary supersampling, a storage area for a higher-resolution image need be reserved even for an area devoid of any object (e.g., a background of a single color). Meanwhile, by configuring these buffers as hierarchical data as described above, an area that will be produced by enlarging a lower-resolution layer need not be rendered at a high resolution.

By allowing the user to designate a necessary resolution area by area, only a minimum number of areas in each layer need be rendered so that the efficiency of memory usage is improved. For frequent updating of tile data and responsive image display, generated tile data need not be compressed. Different methods of antialiasing may be employed depending on the relative size of the target area. For example, supersampling may be performed if antialiasing is required in the entirety of an image.

Antialiasing may be performed by using hierarchical data in one of two approaches. In one approach, only the lowest-layer image is rendered and reduced versions are generated once the image is finalized. In other approach, rendering is performed in the layer designated by the user and the corresponding areas in all layers are concurrently updated. The former approach helps reduce the frequency of reduction processes. The latter approach facilitates prediction of the cost required for pixel generation such as rasterizing, shader process, rendering output pipeline (ROP), pixel transfer, etc. However, the latter approach requires frequent transfer of original images, enlarged images, reduced images, etc. between the graphics processor 402 and the main memory 60 so that the transfer bandwidth tends to be heavily stressed.

Figure 27:
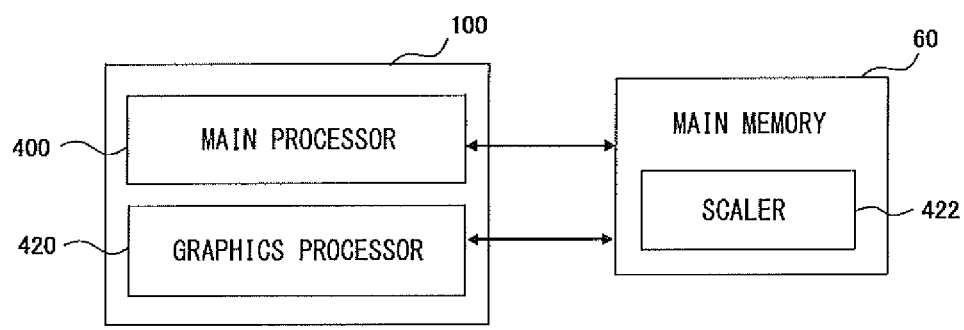
FIG. 27 shows the device configuration where a scaler for performing a scaling process is built in the main memory according to the second embodiment.

Not only antialiasing but also rendering of hierarchical data in general requires frequently scaling (i.e., enlarging or reducing) images in order to reflect the rendering result in the layers. When the image data is transferred between the graphics processor and the main memory each time a scaling process is performed, the transfer bandwidth between the processor and the memory tends to be heavily stressed. To address this, a scaler 422 responsible for scaling may be built in the main memory 60 as shown in FIG. 27.

With this, a graphics processor 420 and the main memory 60 need only exchange the image of the resolution subject to rendering. The scaler 422 ensures that the rendering result is reflected in the layers in the hierarchical data in the main memory 60. As a result, the transfer bandwidth between the graphics processor 420 and the main memory 60 is prevented from being heavily stressed so that the hierarchical data can be efficiently rendered. The scaler 422 may not be built in the main memory 60 and may be connected to the main memory 60 using a bus separate from the bus between the graphics processor 420 and the main memory 60. This configuration can show equal efficacy.

Figure 28:
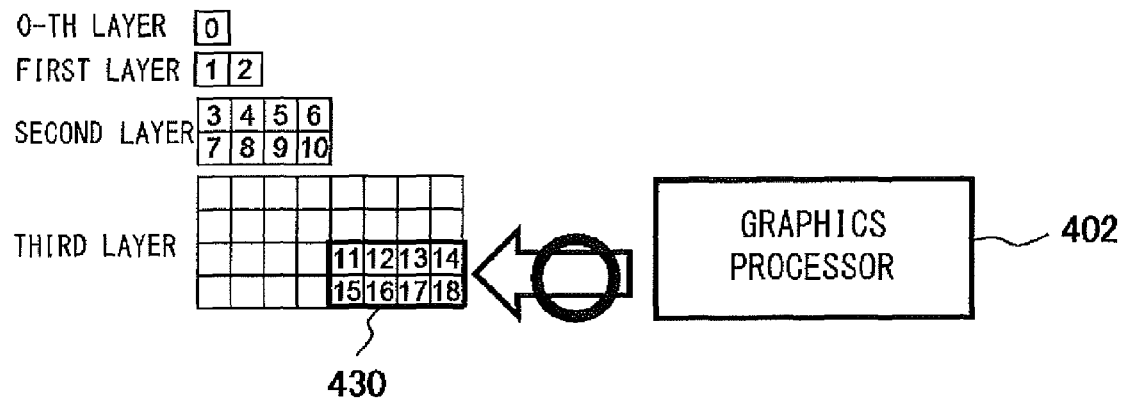
FIG. 28 shows addressing in a GPU buffer according to the second embodiment.
Figure 29:
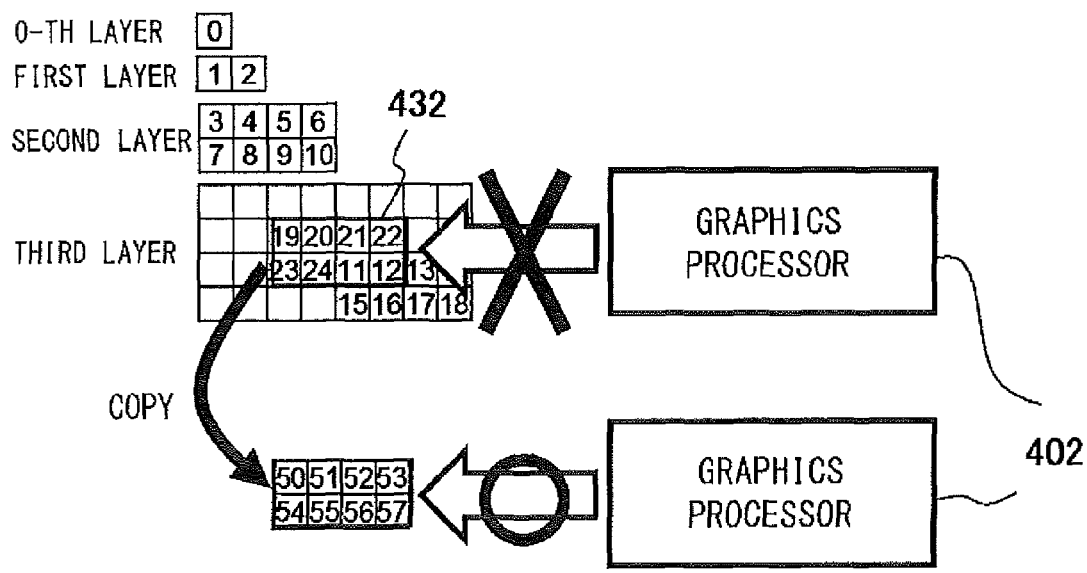
FIG. 29 shows addressing in a GPU buffer according to the second embodiment.

The embodiment described above can be implemented by using an ordinary graphics processor. An ordinary graphics processor employs an approach whereby memory addresses close to each other are assigned to a neighborhood in the image in order to reduce the frequency of read and write operations in the main memory when addressing an internal frame buffer, i.e., the GPU buffer described above. There is a constraint in that areas used in the GPU buffer need occupy a continuous address space. In other words, the GPU buffer cannot be filled with an area with discontinuous addresses. FIGS. 28 and 29 illustrate a process that addresses the constraint.

Referring to FIG. 28, it will be assumed that addresses "11"-"18" are assigned when an area 430 that is a part of the image in the third layer in the hierarchical data is rendered. In this case, the graphics processor 402 is capable of filling the GPU buffer with the area 430. It will be assumed that an area 432 that is a part of the third layer is subsequently rendered as shown in FIG. 29. The area 432 includes areas to which the addresses "11" and "12" are already assigned in FIG. 28. In this case, addresses "19"-"24" are assigned to the other areas in the area 432. Such address assignment results in the area 432 including an area where addresses are discontinuous with the result that the graphics processor 402 cannot fill the GPU buffer with the area 432.

Therefore, the area 432 need temporarily be copied to a separate storage area and new continuous addresses (addresses "50"-"57" in FIG. 29) are assigned to the area 432 before filling the GPU buffer with the area 432. To reduce the associated processing cost, a table mapping the positions in the area to the assigned addresses may be provided in the memory controller (not shown) in the main memory 60 according to this embodiment. In the case of the area 432 in FIG. 9, the positions in the area are indicated by "0"-"7" in the order of rastering. Mapping is established such that "0"="19", "1"="20", "2"="21", "3"="22", "4"="23", "5"="24", "6"="11", and "7"="12".

By translating the addresses in the main memory 60 in this way, an area to which discontinuous addresses are assigned can be rendered without requiring copying for the purpose of continuous filling as shown in FIG. 29. By building the scaler 422 in the memory 60 as shown in FIG. 27, a majority of the steps for generating and updating hierarchical data, including generation of enlarged or reduced images, can be performed solely in the main memory 60.

Rendering of hierarchical data as described in this embodiment provides the advantages including random access to tile data using a header and index blocks, concurrent processing of a plurality of sets of hierarchical data enabled by division of a header and resultant reduced memory cost for each hierarchical data set, and the capability of adding, deleting, and updating tile data in the process of rendering. These features are the same as the requirements for texturing, i.e., random access, multitexturing, and render target. Therefore, hierarchical data can be dealt with in the same way as texture data so that hierarchical data can be put to extensive applications in which computer graphics are used.

Described above is an explanation based on an exemplary embodiment. The embodiment is intended to be illustrative only and it will be obvious to those skilled in the art that various modifications to constituting elements and processes could be developed and that such modifications are also within the scope of the present invention.

DESCRIPTION OF THE REFERENCE NUMERALS 1 information processing system, 10 information processing device, 12 display device, 20 input device, 38 tile image, 50 hard disk drive, 60 main memory, 100 control unit, 102 input information acquisition unit, 106 loaded block determination unit, 108 loading unit, 110 tile image identification unit, 112 decoding unit, 114 displayed image processing unit, 120 image hierarchy generation unit, 122 image division unit, 124 redundancy detection unit, 126 header/index block generation unit, 150 header, 160 index block, 170 tile image, 318 image file acquisition unit, 320 update information acquisition unit, 322 tile image generation unit, 324 header/index block update unit, 326 displayed image control unit, 328 image file generation unit, 400 main processor, 402 graphics processor, 404 rendering unit, 406 hierarchical data update unit, 408 GPU color buffer, 410 GPU-Z buffer, 412 dirty mask, 414 color buffer, 416 Z buffer, 418 model data, 422 scaler, 520 graphics processor As described above, the present invention can be applied to information processing devices such as computers, game devices, image processing devices, image rendering devices, etc.

The invention claimed is:

1. An image file generation device comprising:
   an image hierarchy generation unit configured to generate a plurality of pieces of image data with different resolutions from input image data and to generate hierarchical data formed by hierarchizing the plurality of pieces of data according to resolution;
   an image division unit configured to partition image data in each layer of the hierarchical data into tile images of a predetermined size;
   an index creation unit configured to create index data that maps tile locations defined by partitioning an image in each layer of the hierarchical data into tile images to data for the tile images used to render the tile locations; and
   an image file generation unit configured to generate an image file that includes data for the tile images and the index data,
   wherein the index block creation unit creates the index data in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

2. The image file generation device according to claim 1, wherein the index block creation unit further generates header data that maps areas produced by partitioning the hierarchical structure to the corresponding index blocks, and the image file generation unit includes the header data and the index blocks in the index data.

3. The image file generation device according to claim 1, further comprising:
   a redundancy detection unit configured to analyze an image in a layer of a given resolution so as to identify an area in a higher resolution image in a layer with a higher resolution that can be rendered by using data for a tile image included in the image in the layer of the given resolution,
   wherein the index creation unit maps, in the index data, data for a tile image only to areas other than the area in the higher resolution image identified by the redundancy detection unit.

4. The image file generation device according to claim 1, further comprising:
   a redundancy detection unit configured to analyze an image in a layer of a given resolution so as to identify an area in a higher resolution image in a layer with a higher resolution that can be rendered by using data for a tile image included in the image in the layer of the given resolution,
   wherein, when the area in the higher resolution image identified by the redundancy detection unit extends over the entirety of an area produced by partitioning the hierarchical structure, the image file generation unit excludes from the image file the index block corresponding to said area in the higher resolution image.

5. The image file generation device according to claim 1, wherein the index data maps data for a single tile image to a plurality of tile locations, and the image file does not include data for a tile image not mapped in the index data.

6. The image file generation device according to claim 1, wherein each of the areas produced by partitioning the hierarchical structure includes corresponding areas in the images in a plurality of layers included in the hierarchical data.

7. The image file generation device according to claim 1, wherein the number of tile locations that can be mapped in a single index block to data for tile images is uniform across all index blocks.

8. An image processing device comprising:
   a storage device configured to store an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations;
   an input information acquisition unit configured to acknowledge a user request to change a display area, the user request including a movement on an image plane or change of resolution; and
   a tile image identification unit configured to identify data for a tile image necessary to render an area that should be newly displayed in accordance with the request to change a display area, by referring to the index block;
   a display image processing unit configured to read the data for the identified tile image from the storage device and render the area that should be newly displayed,
   wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

9. The image processing device according to claim 8, wherein the index data includes header data that maps areas produced by partitioning the hierarchical structure to the corresponding index blocks,
   the tile image identification unit identifies data for the necessary tile image, by searching the header data based on information on an area that should be newly displayed, identifying one of the areas produced by partitioning the hierarchical structure that includes the area that should be displayed, and referring to the index block mapped to the identified area.

10. The image processing device according to claim 9, wherein, when a tile location in an image that can be rendered by using data for a tile image included in an image in a layer of a lower resolution extends over the entirety of an area produced by partitioning the hierarchical structure, the header data maps invalid data to said area,
   when the invalid data is mapped in the header data to an area including the area that should be newly displayed and produced by partitioning the hierarchical structure, the tile image identification unit searches the hierarchical data in a direction in which an image is reduced for an area including a reduced version of the area that should be newly displayed and mapped to a specific index block, so as to identify the specific index block and identify a tile image of the reduced version accordingly, and the displayed image processing unit renders the area that should be newly displayed by enlarging the tile image identified by the tile image identification unit.

11. The image processing device according to claim 8, wherein the index data maps invalid data to a tile location in an image that can be rendered by using data for a tile image included in an image in a layer of a lower resolution, when the invalid data is mapped in the index data to a tile location included in the area that should be newly displayed, the tile image identification unit searches the hierarchical data in a direction in which an image is reduced for a tile location mapped to data for a specific tile image included in an area that is a reduced version of the area that should be newly displayed, so as to identify data for the specific tile image, and the displayed image processing unit renders the area that should be newly displayed by enlarging the specific tile image identified by the tile image identification unit.

12. The image processing device according to claim 8, wherein the index data maps a tile location to data for a tile image belonging to a file different from the image file, designating identification information of the file, and the displayed image processing unit reads data for a tile image used in the area that should be newly displayed from the file designated by the index data and renders an image accordingly.

13. An image processing device comprising:

an image file acquisition unit configured to read an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations;

an update information acquisition unit configured to acquire information on update to an image displayed by using the image file;

a tile image generation unit configured to generate data for a new tile image used to render an area to be updated, based on the update information;

an index data update unit configured to update data for a tile image mapped to a tile location defined in the index data as being included in the area to be updated to the data for the new tile image; and an image file generation unit configured to generate an image file that includes data for the tile image generated by the tile image generation unit and the index data updated by the index data update unit, wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

14. The image processing device according to claim 13, wherein the tile image generation unit generates data for new tile images used to render an area to be updated, for all layers forming the hierarchical data, and the index data update unit updates data for tile images mapped to tile locations included in the area to be updated in all layers.

15. The image processing device according to claim 13, wherein the tile image generation unit generates data for a new tile image used to render an area to be updated, only for a specific layer designated by the update information, and the index data update unit updates data for a tile image mapped to a tile location included in the area to be updated in the specific layer.

16. The image processing device according to claim 13, wherein, when the update information designates writing of an image with a resolution higher than the highest resolution in the hierarchical data before the update, the index data update unit additionally defines tile locations in a new layer that has the resolution of the written image and that should be added to the hierarchical data, and maps those of the defined tile locations that should updated to tiles image that include the written image and that are newly generated by the tile image generation unit.

17. The image processing device according to claim 13, wherein, when the update information designates addition of a new image area to an image before the update, the index data update unit newly generates an area corresponding to a portion of the hierarchical structure that changes as a result of adding the new image area, and further generates the index block corresponding to the generated area.

18. The image processing device according to claim 17, wherein the tile image generation unit identifies an area of tile images in which the added image area and the image before the update coexist, and generates data for tile images where coexistence occurs in addition to data for a tile image of the added image area.

19. An image file generation method comprising:

generating a plurality of pieces of image data with different resolutions from input image data, generating hierarchical data formed by hierarchizing the plurality of pieces of data according to resolution, and storing the data in a memory;

reading image data in each layer of the hierarchical data from the memory and partitioning the read data into tile images of a predetermined size;

creating index data that maps tile locations defined by partitioning an image in each layer of the hierarchical data into tile images to data for the tile images used to render the tile locations, and storing the index data in the memory; and generating an image file that includes data for the tile images and the index data, and storing the generated file in the memory, wherein the creating of index data creates the index data in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

20. An image processing method comprising:

reading, from a memory, an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations;

acknowledging a user request to change a display area including movement on an image plane and change of resolution;

identifying data for a tile image necessary to render an area that should be newly displayed in accordance with the request to change a display area, by referring to the index block; and reading the data for the identified tile image from the memory, rendering the area that should be newly displayed, and displaying the rendered data on a display device;

wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

21. An image processing method comprising;

reading, from a memory, an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations;

acquiring information on update to an image displayed by using the image file;

generating data for a new tile image used to render an area to be updated, based on the update information, and storing the generated data in the memory;

updating data for a tile image mapped to a tile location defined in the index data as being included in the area to the data for the new tile image; and generating an image file that includes data for the tile image generated by the tile image generation unit and the index data updated by the index data update unit, and storing the data in the memory, wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

22. A computer program embedded in a non-transitory computer-readable recording medium, comprising:

a module configured to generate a plurality of pieces of image data with different resolutions from input image data, generate hierarchical data formed by hierarchizing the plurality of pieces of data according to resolution, and store the data in a memory;

a module configured to read image data in each layer of the hierarchical data from the memory and partitioning the read data into tile images of a predetermined size;

a module configured to create index data that maps tile locations defined by partitioning an image in each layer of the hierarchical data into tile images to data for the tile images used to render the tile locations, and store the index data in the memory; and a module configured to generate an image file that includes data for the tile images and the index data, and store the file in the memory, wherein the module to create index data creates the index data in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

23. A computer program embedded in a non-transitory computer-readable recording medium, comprising:

a module configured to read, from a memory, an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations;

a module configured to acknowledge a user request to change a display area including movement on an image plane and change of resolution;

a module configured to identify data for a tile image necessary to render an area that should be newly displayed in accordance with the request to change a display area, by referring to the index block; and a module configured to read the data for the identified tile image from the memory, render the area that should be newly displayed, and display the rendered data on a display device;

wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

24. A computer program embedded in a non-transitory computer-readable recording medium, comprising:

a module configured to read, from a memory, an image file including data for tile images produced by partitioning, to a predetermined size, images in hierarchical data comprising image data that represents a single image at different resolutions, and including index data that maps tile locations defined by partitioning an image in each layer of the hierarchical data into tile images to data for the tile images used to render the tile locations;

a module configured to acquire information on update to an image displayed by using the image file;

a module configured to generate data for a new tile image used to render an area to be updated, based on the update information, and store the generated data in the memory;

a module configured to update data for a tile image mapped to a tile location defined in the index data as being included in the area to the data for the new tile image; and a module configured to generate an image file that includes data for the tile image generated by the tile image generation unit and the index data updated by the index data update unit, and store the data in the memory, wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

25. A data structure of an image file read from a storage device to display at least a part of an image on a display, wherein the data structure maps data for tile images produced by partitioning, to a predetermined size, image data that represents a single image at different resolutions, to index data, the index data mapping tile locations defined by partitioning an image in each layer of hierarchical data into tile images to data for the tile images used to render the tile locations, the hierarchical data being formed by hierarchizing said image data according to resolution, and wherein the index data is in the form of index blocks that organize index data for respective tile locations, for each of areas produced by partitioning a hierarchical structure comprising the hierarchical data in a virtual space defined by an image plane of the hierarchical data and an axis of resolution perpendicular to the image plane.

26. The data structure of an image file according to claim 25,
wherein the number of tile locations that can be defined in a single index block is uniform across all index blocks.

27. The data structure of an image file according to claim 25, wherein the index data maps invalid data to a tile location in an image that can be rendered by using data for a tile image included in an image in a layer of a lower resolution, so as to indicate that an image can be rendered by using the included tile image.

* * * * *